United States Patent [19]
Ohtake et al.

[11] Patent Number: 5,737,129
[45] Date of Patent: Apr. 7, 1998

[54] WIDE-ANGLE ZOOM LENS

[75] Inventors: Motoyuki Ohtake, Kanagawa; Akihiko Obama, Toshima-ku, both of Japan

[73] Assignee: Nikon Corporation, Tokyo, Japan

[21] Appl. No.: 577,119

[22] Filed: Dec. 22, 1995

[30]  Foreign Application Priority Data

Dec. 26, 1994 [JP] Japan .................................. 6-337342
Dec. 26, 1994 [JP] Japan .................................. 6-337343

[51] Int. Cl.$^6$ .................................................. G02B 15/14
[52] U.S. Cl. ........................... 359/691; 359/684; 359/686
[58] Field of Search ................................. 359/691, 685, 359/684

[56]  References Cited

U.S. PATENT DOCUMENTS

| | | | |
|---|---|---|---|
| 4,844,602 | 7/1989 | Kitagishi et al. | 359/557 |
| 4,907,868 | 3/1990 | Kitagishi et al. | 359/557 |
| 4,929,069 | 5/1990 | Shibayama | 359/692 |
| 4,974,950 | 12/1990 | Yamazaki et al. | 359/557 |
| 4,986,643 | 1/1991 | Moriyama | 359/689 |
| 5,039,211 | 8/1991 | Maruyama | 359/557 |
| 5,182,673 | 1/1993 | Kikuchi et al. | 359/691 |
| 5,270,857 | 12/1993 | Oizumj et al. | 359/554 |
| 5,270,865 | 12/1993 | Kikuchi | 359/686 |
| 5,337,098 | 8/1994 | Imafugi et al. | 354/70 |
| 5,339,195 | 8/1994 | Ogara | 359/691 |
| 5,402,197 | 3/1995 | Okano et al. | 354/410 |
| 5,416,558 | 5/1995 | Katayama et al. | 354/446 |

FOREIGN PATENT DOCUMENTS

| | | |
|---|---|---|
| 655 638 | 5/1995 | European Pat. Off. . |
| A-57-169716 | 10/1982 | Japan . |
| A-60-188918 | 9/1985 | Japan . |
| A-62-75412 | 4/1987 | Japan . |
| A-63-157120 | 6/1988 | Japan . |
| A-3-141313 | 6/1991 | Japan . |
| A-5-244160 | 9/1993 | Japan . |
| A-6-132091 | 5/1994 | Japan . |
| A-6-265788 | 9/1994 | Japan . |

*Primary Examiner*—Scott J. Sugarman
*Attorney, Agent, or Firm*—Oliff & Berridge, PLC

[57]  ABSTRACT

The zoom lens of present invention includes, in order from the object side, a first lens group of negative refractive power and a second lens group of positive refractive power, such that each lens group moves during zooming from the maximum wide-angle state to the maximum telephoto state so that the distance between the first lens group and the second lens group decreases. The second lens group has, in order from the object side, a first lens subgroup of positive refractive power, having first and second lens units of positive refractive power, and a second lens subgroup of negative refractive power. The zoom lens satisfies at least one of the following conditions:

$$0.2 < Bfw/fw < 0.75$$

$$0.6 < |f1|/(fw \times ft)^{1/2} < 0.95$$

$$0.4 < |f2a/f2b| < 0.85,$$

wherein Bfw is the back focus at the maximum wide-angle state, fw is a focal length of the totality of the zoom lens system at the maximum wide angle state, ft is the focal length of the totality of the zoom lens system at a maximum telephoto state, and f2a and f2b are the focal lengths of the first and second lens subgroups respectively. Focussing on close-distance objects is conducted by causing the second lens unit $G2a_2$ to move along the optical axis; and the imaging magnification $\beta 2a_2 t$ of the second lens unit at the maximum telephoto state satisfies the condition:

$$-0.5 < \beta 2a_2 t < 0.6.$$

16 Claims, 30 Drawing Sheets

WIDE-ANGLE ZOOM LENS

BACKGROUND OF THE INVENTION

1. Field of the Invention

The present invention relates to a wide-angle zoom lens that is suitable for a camera of lens shutter type, or the like.

2. Background of Related Art

Cameras equipped with zoom lenses are the most prevalent of lens shutter type cameras. In particular, in recent years the number of cameras equipped with high zoom ratio zoom lenses which have twice or higher zoom ratio and the number of cameras equipped with zoom lenses with a broader wide-angle range have increased.

Zoom lenses with a broader wide-angle range including a positive-negative two group zoom lens have been proposed. An example of such a zoom lens is disclosed in Japanese Laid Open Patent Publication Hei 2-73322 and corresponding U.S. Pat. No. 4,929,069. A negative-positive two group zoom lens has also been proposed. Such zoom lenses are disclosed in Japanese Laid-Open Patent Publication Sho 61-50111 and in Japanese Laid-Open Patent Publication Hei 4-218013 and corresponding U.S. Pat. No. 5,182,673.

The positive-negative two group zoom lens disclosed in the above-mentioned references includes, in order from the object side, a first movable lens group of positive refractive power and a second movable lens group of negative refractive power. Furthermore, zooming from the maximum wide-angle state to the maximum telephoto state is conducted by moving the lens groups so that the distance between the first lens group and the second lens group decreases.

In addition, the negative-positive two group zoom lenses disclosed in Japanese Laid-Open Patent Publication Sho 61-50111 and in U.S. Pat. No. 5,182,673 include, in order from the object side, a first movable lens group having negative refractive power and a second movable lens group having positive refractive power. Furthermore, zooming from the maximum wide-angle state to the maximum telephoto state is conducted by moving the lens groups so that the distance between the first lens group and the second lens group decreases.

However, with the zoom lens disclosed in Japanese Laid-Open Patent Publication Sho 61-50111, the principal point of the entire lens system is always positioned to the image side of the second lens group G2 during zooming. Consequently, the total length of the lens system becomes large, making it difficult to make the lens system more compact.

On the other hand, with the zoom lens disclosed in U.S. Pat. No. 5,182,673, the second lens group includes a lens group of positive refractive power and a lens group of negative refractive power. Furthermore, the back focus at maximum wide-angle state is shortened, and the total length of the lens system is also shortened.

In U.S. Pat. No. 5,182,673, the back focus is shortened at the maximum wide-angle state by positioning a negative lens group closest to the image plane. Furthermore, the angle is widened by separating from the optical axis the off-axis rays passing through the negative lens group, making correction of variations in coma aberrations accompanying changes in the field angle easy. In addition, by making the change in the back focus large when zooming from maximum wide-angle state to maximum telephoto state, the change in the distance of the off-axis rays from the optical axis passing through the negative lens group becomes larger, so that variations in the off-axis aberrations accompanying zooming are suppressed. However, it is possible for the back focus to be shortened too much, thereby causing off-axis rays to separate from the optical axis. Thus, a larger lens diameter would be required.

Next, methods for conducting focussing on close-distance objects will be described.

In general, a focussing lens group that moves along the optical axis when close-distance focussing is conducted must satisfy several requirements. The lens or lenses in the group must be light weight, have a small lens diameter, and have a small displacement from the infinite focus state to the closest distance photographic state. This is because the smaller the displacement of the focussing lens group, the more beneficial in terms of minimizing the size of the lens system as a whole; the lighter the focussing lens group is in weight, the more beneficial in terms of simplifying the structure that moves the focussing lens group; and the smaller the lens diameter of the focussing lens group, the more beneficial in terms of minimizing the diameter of the lens barrel.

When the so-called whole-system focussing method of close distance focussing, wherein close-distance focussing is conducted by causing all of the lens groups to move integrally along the optical axis, is applied to a zoom lens, driving of the lens groups is difficult because each of the lens groups moves even during zooming. Thus, the principal method in zoom lenses is to conduct close-distance focussing by moving only a portion of the lens groups.

When focussing in a zoom lens on a close distance object from a far-distant object, or changing the distance between the object and the image plane; the following three methods of focussing are known:

(A) The FF (front focussing) method
(B) The IF (inner focussing) method
(C) The RF (rear focussing) method However, when the angle is widened in a positive-negative two group zoom lens, the distance between the first lens group and the second lens group increases, the back focus shortens dramatically, and off-axis rays pass through positions even further separated from the optical axis. Consequently, the problem of increased lens diameter arises. The diameter of the second lens group must be made extremely large in order to obtain a predetermined amount of light in the marginal zones.

In addition, with the negative-positive two group zoom lens disclosed in U.S. Pat. No. 5,182,673, the back focus at maximum wide-angle state is short. Accordingly, when widening the angles in this zoom lens, the off-axis rays passing through the second portion of the second lens group separate from the optical axis. Therefore, the diameter of the rearmost lens must be enlarged.

Furthermore, when close-distance focussing is effected in a negative-positive two group zoom lens, the FF method of (A) and the RF method of (C) can be considered. However, because the off-axis rays passing through the first lens group at maximum wide-angle state are separated from the optical axis, the lens diameter of the first lens group must be enlarged. As a result, the FF method of (A), wherein the focussing lens group is the first lens group, which has a large lens diameter, is not suitable to a negative-positive two group zoom lens.

In addition, because the lateral magnification of the second lens group varies above and below 100% magnification when zooming from maximum wide-angle state to maximum telephoto state, it is impossible to make the second lens group the focussing lens group using the RF method of (C).

SUMMARY OF THE INVENTION

In consideration of the foregoing, it is an objective of the present invention to provide a wide-angle zoom lens which is compact yet has superior performance.

The present invention provides a wide-angle zoom lens in order to resolve the above problems. The zoom lens includes, in order from the object side, a first lens group of negative refractive power and a second lens group of positive refractive power, such that each lens group moves during zooming from the maximum wide-angle state to the maximum telephoto state so that the distance between the first lens group and the second lens group decreases.

The second lens group has, in order from the object side, a lens subgroup of positive refractive power and a second lens subgroup of negative refractive power. The first lens subgroup includes two lens units, each having positive refractive power. Each group, subgroup, and unit includes one or more lens components.

Accordingly, in one aspect of the invention, the back focus Bfw at maximum wide-angle state, the focal length fw of the totality of the lens system at maximum wide-angle state, the focal length ft of the totality of the lens system at maximum telephoto state, the focal length f1 of the lens group G1, the focal length f2a of the first lens subgroup, and the focal length f2b of the second lens subgroup satisfy one or more of the following equations;

$$0.2 < Bfw/fw < 0.75 \quad (1)$$

$$0.6 < |f1|/(fw \times ft)^{1/2} < 0.95 \quad (2)$$

$$0.4 < f2a/|f2b| < 0.85 \quad (3)$$

An embodiment of the present invention provides a wide-angle zoom lens wherein an aperture-stop is provided within the first lens subgroup or adjacent to the first lens subgroup on the image side of the zoom lens. The focal length fw of the totality of the lens system at maximum wide-angle state, the focal length ft of the totality of the lens system at maximum telephoto state, the focal length f1 of the first lens group and the focal length f2b of the second lens subgroup satisfy:

$$0.4 < f2b/f1 < 1.0 \quad (4)$$

$$0.3 < f2/(fw \times ft)^{1/2} < 0.8 \quad (5)$$

Focussing on close-distance objects is conducted by causing the second lens unit to move along the optical axis; and the imaging magnification $\beta 2a_2 t$ of the second lens unit at the maximum telephoto state satisfies the condition:

$$-0.05 < \beta 2a_2 t < 0.6. \quad (6)$$

Additionally, in an embodiment of the present invention, the condition:

$$0.8 < f2a_2/(fw \times ft)^{1/2} < 1.4 \quad (7)$$

is satisfied, where $f2a_2$ is the focal length of the second lens unit, fw is the focal length of the entire lens system at the maximum wide-angle state, and ft is the focal length of the entire lens system at the maximum telephoto state.

As explained hereafter, both widening of the angle of the zoom lens and boosting the performance thereof are realized through the structure of the present invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
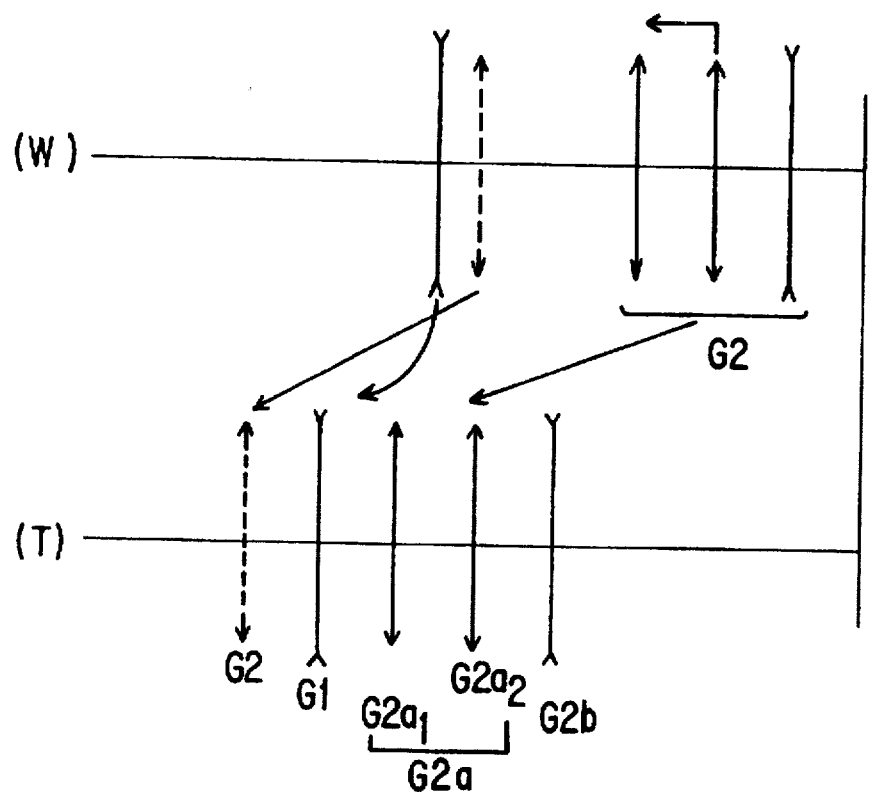
FIG. 1 shows the basic structure of the zoom lens according to each embodiment of the present invention, the condition of the movement of each lens group during zooming from maximum wide-angle state (W) to maximum telephoto state (T), and the condition of the movement of the lens focussing group $G2a_2$ during focussing from a far distant object to a close-distance object.

As described above, in a zoom lens in which the back focus is not restricted and which is suitable for a camera of lens shutter type, positioning a negative lens group closest to the image plane is beneficial in terms of attempting to widen the angle. Accordingly, in the present invention, second lens subgroup G2b of negative refractive power is positioned closest to the image plane in the second lens group G2, and the back focus is shortened at the maximum wide-angle state. Furthermore, the off-axis rays most distant from the optical axis passing through the lens group G2b separate from the optical axis, making correction of variations in coma aberrations accompanying changes in the field angle easy, and boosting efforts to widen the angles.

However, if the back focus at the maximum wide-angle state is shortened too much, the off-axis rays passing through the second lens subgroup will separate too much from the optical axis, causing the lens diameter to become larger. Consequently, it is desirable for the back focus at maximum wide-angle state to be a value within an appropriate range. Furthermore, by increasing the change in the back focus when zooming from maximum wide-angle state to maximum telephoto state, the change in the height of the off-axis rays passing through the second lens subgroup is increased, so that variations in coma aberrations during zooming can be corrected adequately.

Next, when the attempt is made to widen the angles, if the first lens group which is positioned nearest the object side, has a positive refractive power as in the prior art zoom lenses, off-axis rays passing through the first lens group at maximum wide-angle state will separate substantially from the optical axis. In addition, by the cosine fourth law, the amount of light in the marginal zone decreases in comparison to the aperture efficiency. Consequently, when the attempt is made to secure an amount of light in the marginal zone which is at least as great as a predetermined amount, the diameter of the frontmost lens becomes larger, so that making the lens system more compact becomes impossible. Moreover, because the convergence operation of the first lens group is strong, it is impossible to obtain an adequate back focus, so that the diameter of the rearmost lens also increases.

Accordingly, in the present invention, the first lens group which is positioned nearest to the object side, has a negative refractive power. As a result, not only is it possible to make the diameter of the frontmost lens smaller, it is possible to obtain adequate back focus even at maximum wide-angle state, and it is also possible simultaneously to make the diameter of the rearmost lens smaller. In addition, because the positioning of the lenses causes the refractive powers of the lens system to become symmetrical (the second lens subgroup closest to the image plane has negative refractive power), benefits are achieved in terms of conducting correction of distortion aberrations and correction of chromatic aberrations of magnification.

In the present invention, the first lens group G1, which is positioned nearest the object side, and the second lens subgroup G2b, which is positioned nearest the image side, both have negative refractive powers. Accordingly, on-axis rays are once dispersed by the first lens group G1, and are strongly caused to converge by the first lens subgroup G2a. Consequently, the refractive power of the first lens subgroup G2a tends to become larger in the positive direction, and the aberration generated from focussing lenses is well corrected for a large aperture. Accordingly, it is preferable for the first lens subgroup G2a to have a shape that is beneficial in terms of brightness.

Hereafter, each condition of the present invention will be described.

A zoom lens of the present invention satisfies the conditions (1) through (3) below.

$$0.2 < Bfw/fw < 0.75 \quad (1)$$

$$0.6 < |f1|/(fw \times ft)^{1/2} < 0.95 \quad (2)$$

$$0.4 < |f2a/f2b| < 0.85 \quad (3)$$

Here,

Bfw: Back focus at maximum wide-angle state;

fw: Focal length of the totality of lens system at maximum wide-angle state;

ft: Focal length of the totality of lens system at maximum telephoto state;

f1: Focal length of the first lens group G1;

f2a: Focal length of the lens group G2a; and f2b: Focal length of the lens group G2b.

Equation (1) is a condition designed to maintain balance between the decrease of the diameter of the lens and shortening of the total length of the lens system.

Hereafter, positioning of refractive power at the maximum wide-angle state will be described using the lens system shown in FIG. 2(b).

Figure 2A:
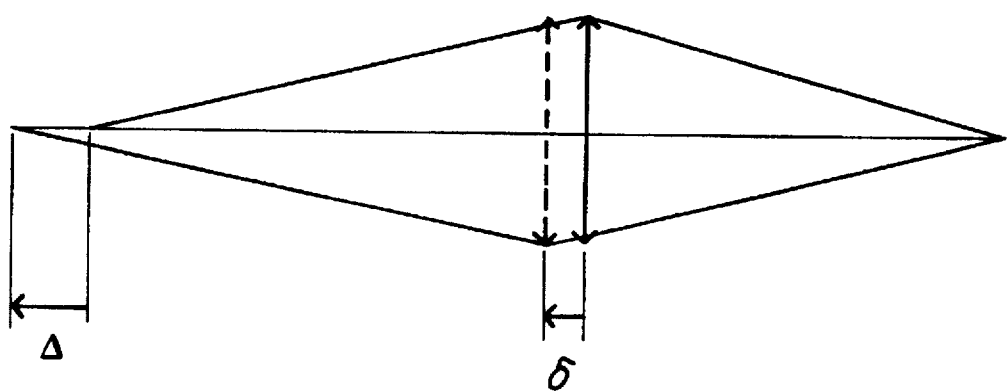
FIG. 2(a) shows the focussing method of the present invention and FIG. 2(b) shows the refractive power arrangement at maximum wide angle state in the present invention.
Figure 2B:
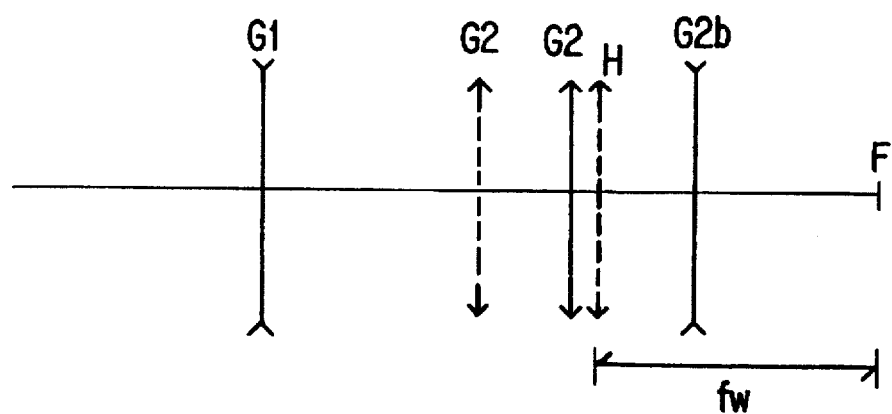

In FIG. 2(b), F denotes Gaussian image plane position and H denotes principal point for the totality of the lens system, respectively. The interval between Gaussian image plane position F and the principal point position H corresponds to the focal length fw for the totality of the lens system at maximum wide-angle state.

In the present invention, the second lens group G2 comprises the lens subgroup G2a with positive refractive power and the lens subgroup G2b with negative refractive power.

Hence the principal point position of the lens group G2 is made closer to the object and the principal point position H for the totality of lens system at maximum wide-angle state is positioned in the second lens group G2. In this manner, back focus at maximum wide-angle state is shortened, resulting in shorter total length of the lens system at maximum telephoto state.

If the upper limit of the condition (1) is exceeded, (a) the absolute value of the negative focal length f1 of the first lens group G1 becomes smaller or (b) the principal point position of the second lens group G2 moves towards the image side from the second lens group G2.

If the absolute value of the negative focal length f1 of the first lens group becomes smaller, the positioning of refractive power at maximum wide-angle state becomes very asymmetric, hence negative distortion aberration cannot be corrected. Moreover, off-axis rays passing through the first lens group G1 approach the optical axis, on-axis aberration and off-axis aberration cannot be corrected independently, and wider-angle state cannot be achieved.

On the other hand, if the principal point position of the second lens group G2 moves closer to the image side from the second lens group G2, the interval between the first lens group G1 and the second lens group G2 cannot be sufficiently long at maximum telephoto state, hence the desired zoom ratio cannot be obtained.

Conversely, if the lower limit of the condition (1) is breached, (c) the absolute value of the negative focal length f1 of the first lens group G1 becomes larger or (d) the principal point position of the second lens group moves towards the object side from the second lens group G2.

If the absolute value of the negative focal length f1 of the first lens group becomes larger, off-axis rays passing through the first lens group separate from the optical axis at maximum wide-angle state and the diameter of frontmost lens becomes large.

If the principal point position of the second lens group G2 moves towards the object side from the second lens group G2, refractive power of the first lens subgroup G2a and second lens subgroup G2b become stronger independently, causing back focus to become shorter at maximum wide-angle state. Hence, the variations caused by field angle of upper coma generated by the second lens subgroup G2b cannot be controlled.

Equation (2) is a condition that defines the focal length f1 of the first lens group G1 and is designed to select proper zoom locus in order to make the totality of lens system smaller.

If the upper limit of the condition (2) is exceeded, divergence effect of the first lens group G1 becomes weak and the distance between the first lens group G1 and the second lens group G2 becomes smaller in securing predetermined zoom range, hence sufficient distance cannot be obtained at maximum telephoto state.

On the other hand, if the lower limit of condition (2) is breached, divergence operation of the first lens group G1 becomes strong and the positive refractive power of the second lens group G2 becomes strong in securing predetermined zoom range. Hence, the positioning of refractive power at maximum wide-angle state becomes extremely asymmetrical and negative distortion aberration cannot be corrected satisfactorily.

In correcting aberration of the lens system, the Petzval sum is used as a criterion for correcting curvature of image plane.

The Petzval sum is expressed in terms of the total sums of values obtained by dividing refractive power of each lens surface by the refraction index. In general, if the Petzval sum becomes a large positive number, negative image plane bow becomes large. Conversely, if Petzval sum becomes a negative number with a large absolute value, positive image plane bow becomes large.

In the case of wide-angle lens, field angle is wide and superior performance is required not only around the central region of the screen but also in the outer region of the screen. Hence, image plane bow must be corrected even more satisfactorily and it is desired to make the Petzval sum more appropriate.

Condition (3) defines a proper range for ratio of focal lengths of the first lens subgroup G2a with positive refractive power and the second lens subgroup G2b with negative refractive power, both of which compose the second lens group G2.

If the upper limit of condition (3) is exceeded, the focal length of the first lens subgroup G2a becomes larger than the focal length of the second lens subgroup G2b and the Petzval sum becomes a negative number with a large absolute value. Hence the positive image plane bow cannot be corrected.

On the other hand, if the lower limit of condition (3) is breached, convergence effect by the first lens subgroup G2a becomes strong, causing the back focus to be short at maximum wide-angle state. Moreover, divergence effect by the second lens subgroup G2b becomes weak and the off-axis rays passing through the second lens subgroup G2b at maximum wide-angle state separate from the optical axis, causing diameter of rearmost lens to become large.

Moreover, in order to obtain even better performance, the conditions (4) and (5) should be satisfied.

$$0.4 < f2b/f1 < 1.0 \qquad (4)$$

$$0.3 < f2/(fw \times ft)^{1/2} < 0.8 \qquad (5)$$

where f2: focal length of the second lens group G2.

Equation (4) is a condition for balancing shortening of the total length of the lens system and making lens diameter smaller.

If the upper limit of condition (4) is exceeded, the absolute value of the negative focal length f1 of the lens group G1 becomes smaller and sufficient back focus is obtained at maximum wide-angle state. Moreover, off-axis ray passing through the first lens group G1 and the lens group G2b approach the optical axis, hence the diameter of frontmost lens and diameter of rearmost lens can be made smaller. However, divergence effect of the first lens group G1 becomes large and aberration generated from lens subgroup G2a is well corrected for large aperture, hence negative spherical surface aberration generated by the lens subgroup G2a cannot be corrected satisfactorily. Moreover total length of the lens system at maximum telephoto state becomes longer and the lens system becomes large.

On the other hand, if the lower limit of condition (4) is breached, the absolute value of the negative focal length f1 of the first group G1 becomes larger and off-axis rays separate from the optical axis, hence, the diameter of the lens cannot be made small.

Here, in order to make the balance efficiently between shortening of the total length of the lens system and making the diameter of the lens smaller, the lower limit of the condition (4) should be changed to 0.5 or the upper limit should be changed to 0.87.

Condition (5) defines a proper range for focal length f2 of the second lens group G2.

If the upper limit of condition (5) is exceeded, the principal point interval between the first lens group G1 and the second lens group G2 at the maximum telephoto state becomes too large and the principal point position of the lens group G2 moves towards the image side. Hence, the total length of the lens system at the maximum telephoto state becomes too large and the lens system cannot be made small.

On the other hand, if the lower limit of condition (5) is breached, the focal length of the first lens subgroup G2a becomes too small of a positive number. Hence the positive spherical aberration generated by the first lens subgroup G2a cannot be corrected.

In order to miniaturize the system while maintaining high functionality of the system, the lower limit of condition (5) can be changed to 0.53 and the upper limit can be changed to 0.62. These limits will optimize the functionality of the system.

Furthermore, in the present invention, it is possible to obtain even higher performance or to make the structure even simpler by introducing an aspherical surface for at least one surface.

It is also possible to obtain so-called anti-vibration effect by properly moving (decentering) one or more groups of lenses in the direction substantially orthogonal to the optical axis, thus correcting the movement of image position caused by camera shaking and the like.

Moreover, by adopting a rear focusing method in which the second lens unit $G2a_2$ is moved for focusing, superior performance is obtained for both close and distant objects.

Now, conditions for conducting focussing with the second lens unit $G2a_2$ will be described.

When the position of the object moves from a far distance to a close distance, it is possible to conduct focussing if the second lens unit $G2a_2$ is caused to move so that the positions of the first lens group G1 and the focussing lens unit $G2a_2$ are fixed with respect to the lens subgroup G2b. Conditions under which the displacement $\Delta$ of the second lens unit $G2a_2$ is reduced when this occurs will now be described with reference to a thin lens system.

First, as shown in FIG. 2(a), when the position of the object point with respect to the focussing lens unit $G2a_2$ moves by an amount $\delta$, the displacement $\Delta$ of the lens unit $G2a_2$ can be found from the following equation (a), wherein $\beta 2a_2$ is the imaging magnification of the lens unit $G2a_2$.

$$\Delta = |\beta 2a_2^2/(\beta 2a_2^2 - 1)| \cdot \delta \qquad (a)$$

In this equation (a), setting $k = \beta 2a_2^2/(\beta 2a_2^2 - 1)$, the value of k depends on $\beta 2a_2^2$, and can be expressed with the following equations (b) and (c).

$$1 \leq k \quad (\beta 2a_2^2 > 1) \qquad (b)$$

$$0 > k \quad (\beta 2a_2^2 < 1) \qquad (c)$$

Accordingly, in order to make the displacement $\Delta$ of the lens unit $G2a_2$ smaller, k must approach 1 in the case of (b) ($1/\beta 2a_2$ must approach 0). In the case of (c), it is necessary for k to approach 0, ($\beta 2a_2$ must approach 0). In the present invention, the displacement $\Delta$ of the lens group $G2a_2$ at the time of focussing is made smaller by causing $\beta 2a_2$ to approach 0.

At this time, because $\beta 2a_2$ is caused to approach 0 to the extent possible in the present invention as explained above, it is preferable for the composite refractive power of the first lens group G1 and the first lens unit $G2a_1$ to approach 0 to the extent possible. That is to say, calling $\beta 2a_1$ the lateral magnification of the lens unit $G2a_1$, it is preferable for $1/\beta 2a_1$ to approach 0.

In this way, when focussing is conducted through the second lens unit $G2a_2$, the imaging magnification of the first lens unit $G2a_1$ and the second lens unit $G2a_2$ must be set to a suitable value.

In the present invention, the first lens group G1, which is positioned nearest the object side, and the lens subgroup G2b, which is positioned nearest the image side, both have negative refractive powers. Accordingly, on-axis rays are once dispersed by the first lens group G1, and are strongly caused to converge by the first lens unit $G2a_1$. Consequently, the refractive power of the lens unit $G2a_1$ tends to become larger in the positive direction, and the aberration generated from focussing lens group is well corrected for a large aperture. Accordingly, it is preferable for the first lens unit $G2a_2$ to have a shape that is beneficial in terms of brightness.

In addition, in order to make the lens diameter smaller, it is desirable for the aperture stop to be provided within the second lens group G2. In particular, it is possible to make the stop diameter smaller by positioning the aperture stop between the lens units $G2a_1$ and $G2a_2$.

Hereafter, the various conditions of focussing of the present invention will be described.

The zoom lens of the present invention satisfies the following condition (6).

$$-0.5 < \beta 2a_2 t < 0.6 \qquad (6)$$

Here, $\beta 2a_2 t$ is the imaging magnification of the focussing lens unit $G2a_2$ at maximum telephoto state.

Condition (6) stipulates the lateral magnification of the focussing lens unit $G2a_2$ at maximum telephoto state, and is a condition that is used to find a balance between shortening the total length of the lens system and making the focussing lens group smaller.

When the upper limit in condition (6) is exceeded, the lateral magnification of the second lens subgroup G2b at maximum telephoto state becomes too large in the positive direction, causing the focussing displacement of the second lens unit $G2a_2$ during close-distance focussing to become large.

Conversely, when the lower limit in condition (6) is breached, the absolute value of the negative lateral magnification of the second lens unit $G2a_2$ at maximum telephoto state becomes too large. Because the second lens unit $G2a_2$ has positive refractive power, the absolute value of the negative composite refractive power of the first lens group G1 and the first lens unit $G2a_2$ becomes large. Consequently, the total length of the lens system at maximum telephoto state becomes large, making it impossible to make the lens system smaller.

In the present invention, it is desirable to make 0 the lower limit in condition (6) in order to further reduce the size of the lens system.

In addition, in order to reduce the number of lens elements that comprise the focussing lens unit $G2a_2$ and to thereby simplify the focussing mechanism in the present invention, it is desirable for the following condition (7) to be satisfied:

$$0.8 < f2a_2/(fw \times ft)^{1/2} < 1.4 \qquad (7)$$

Here, $f2a_2$ is the focal length of the focussing lens group $G2a_2$, fw is the focal length of the entire lens system at maximum wide-angle state, and fw is the focal length of the entire lens system at maximum telephoto state.

Condition (7) stipulates the appropriate range for the focal length f2a₂ of the focussing lens group G2a₂.

When the upper limit in condition (7) is exceeded, the focal length of the second lens unit G2a₂ becomes large. Consequently, the positive refractive power of the lens system is insufficient, the focal length of the first lens unit G2a₁ becomes smaller in the positive direction, and the composite refractive power of the first lens group G1 and the first lens unit G2a₁ becomes larger in the positive direction. As a result, the displacement of the focussing lens unit G2a₂ during close-distance focussing becomes larger, thereby defeating the primary purpose of the present invention, which is to make the lens system smaller.

Conversely, when the lower limit in condition (7) is breached, the focal length of the second lens subgroup G2b becomes smaller. Consequently, the aberration generated from the focussing lens unit G2a₂ is well corrected for a large aperture, and the number of lens elements comprising the lens unit G2a₂ becomes larger.

In addition, in order to better suppress variations in the various aberrations during close-distance focussing, it is preferable for the second lens subgroup G2b to have at least one positive lens element and at least one negative element, and for the following condition (8) to be satisfied:

$$0.7 < |f2b|/fw < 1.4 \qquad (8)$$

Here, f2b is the focal length of second lens subgroup G2b.

In the present invention, first lens unit G2a₁, second lens unit G2a₂, and second lens subgroup G2b, which together comprise the second lens group G2, move integrally during zooming, and consequently, it is not necessary to correct aberrations independently for each lens group. However, during close-distance focussing, only the second lens unit G2a₂, which is the focussing lens unit, moves. Consequently, variations in the various aberrations during close-distance focussing are created unless aberration correction is conducted on the second lens subgroup G2b itself. Therefore, by comprising the second lens subgroup G2b of at least one positive lens element and one negative lens element, it becomes possible to correct the chromatic aberrations and spherical aberrations of the second lens subgroup G2b itself.

The condition (8) stipulates the suitable range for the focal length of the lens subgroup G2b.

When the upper limit in condition (8) is exceeded, the absolute value of the negative focal length of the second lens subgroup G2b becomes too large, the dispersion function becomes stronger, and off-axis rays passing through the second lens subgroup G2b at maximum wide-angle state approach the optical axis. As a result, it becomes impossible to correct on-axis aberrations and off-axis aberrations independently.

In addition, in order to adequately suppress variations in the various aberrations during close-distance focussing in the present invention, it is desirable for the aperture stop to be positioned to the object side of the focussing lens unit G2a₂ or adjacent to the image side thereof. Through this placement, the difference between the heights of the on-axis rays and the off-axis rays passing through the focussing lens group G2a₂ is diminished, and it becomes possible to make the lens diameter of the focussing lens unit G2a₂ smaller and to thereby make the lens system smaller.

In the present invention, it is possible to simplify the structure and to obtain better performance by introducing an aspherical surface on at least one of the surfaces.

In addition, it is possible to obtain so-called anti-vibration effects that correct fluctuations in the image position caused by camera shaking or the like by causing a single lens group or a plurality of lens groups to be moved (decentered) appropriately in a direction substantially orthogonal to the optical axis.

FIG. 1 shows the basic structure of the zoom lens according to each embodiment of the present invention, the condition of the movement of each lens group during zooming from maximum wide-angle state (W) to maximum telephoto state (T), and the condition of the movement of the second lens unit G2a₂ during focussing from a far distant object to a close-distance object.

As shown in FIG. 1, the zoom lens in each embodiment of the present invention comprises, in order from the object side, a first lens group G1 having a negative refractive power and a second lens group G2 having a positive refractive power (indicated by the broken lines in the figure). Furthermore, during zooming from the maximum wide-angle state to the maximum telephoto state, each lens group moves so that the distance between the first lens group G1 and the second lens group G2 decreases. The second lens group G2 has, in order from the object side, a first lens subgroup G2a of positive refractive power and a second lens subgroup G2b of negative refractive power. The first lens subgroup G2a includes lens units G2a₁ and G2a₂ of positive refractive power. Furthermore, focussing on close-distance objects is conducted by causing the lens unit G2a₂ to move along the optical axis.

Figure 3:
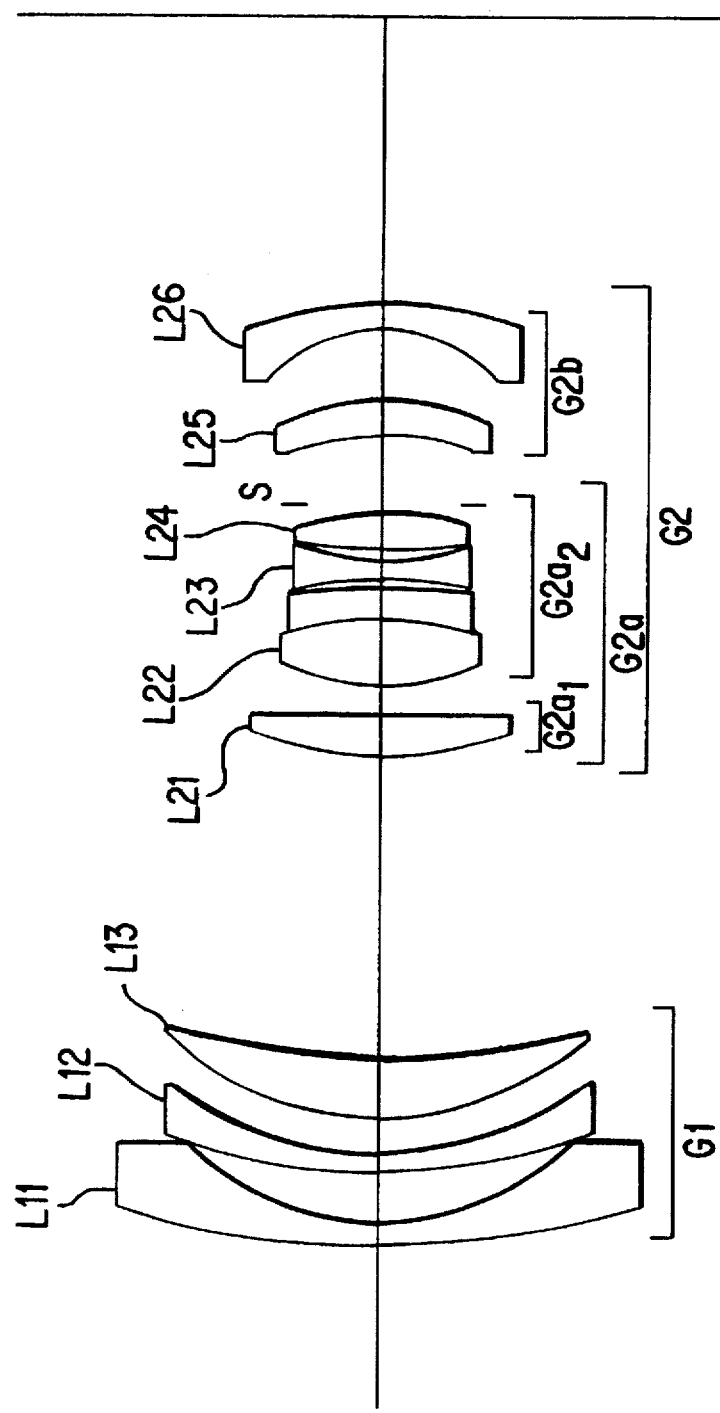
FIG. 3 shows the structure of a zoom lens according to the first embodiment of the present invention.
Figure 4:
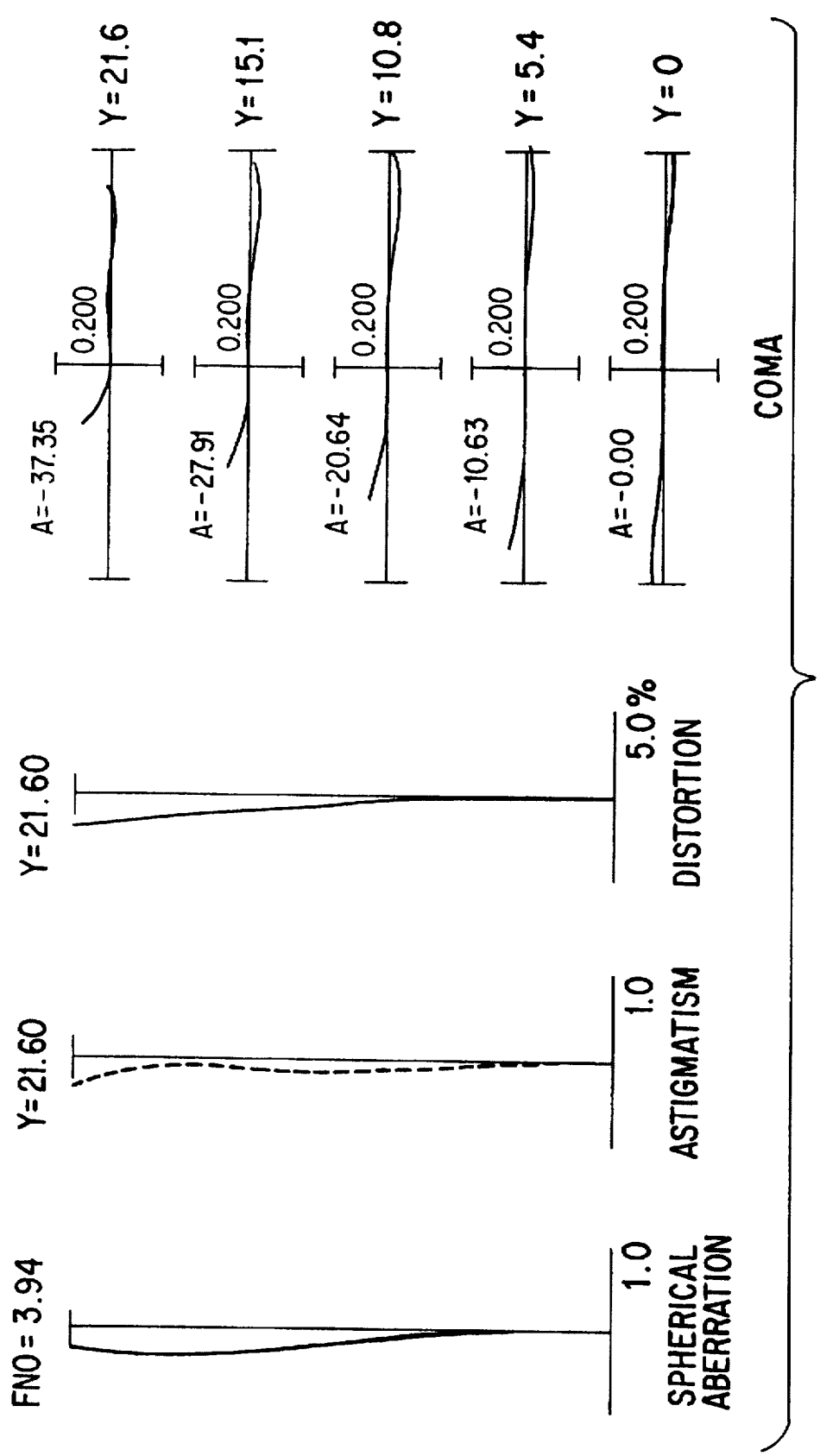
FIG. 4 shows the various aberrations for the infinite focus state at maximum wide-angle state in the first embodiment.
Figure 5:
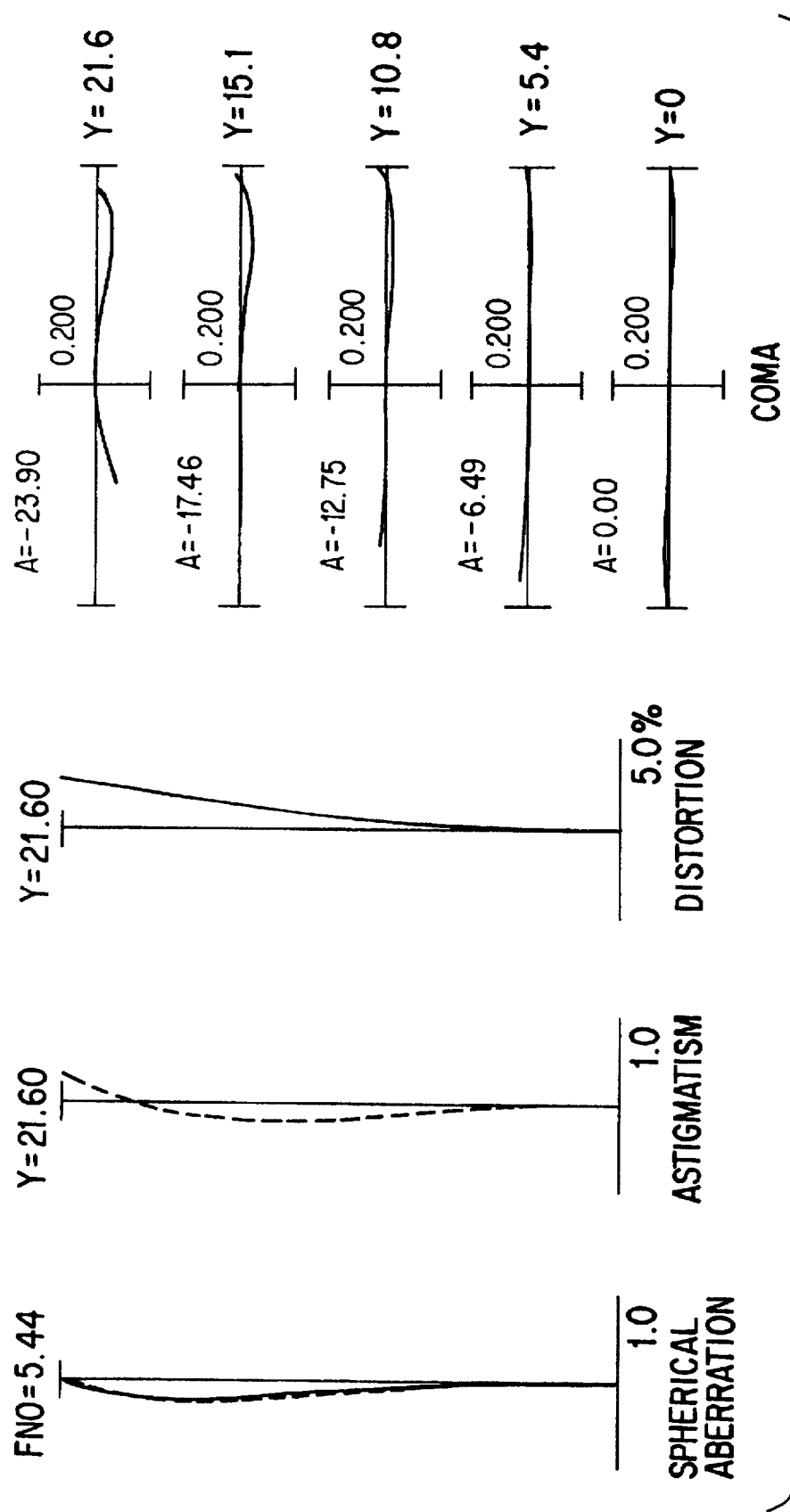
FIG. 5 shows the various aberrations for the infinite focus state at intermediate focal length state in the first embodiment.
Figure 6:
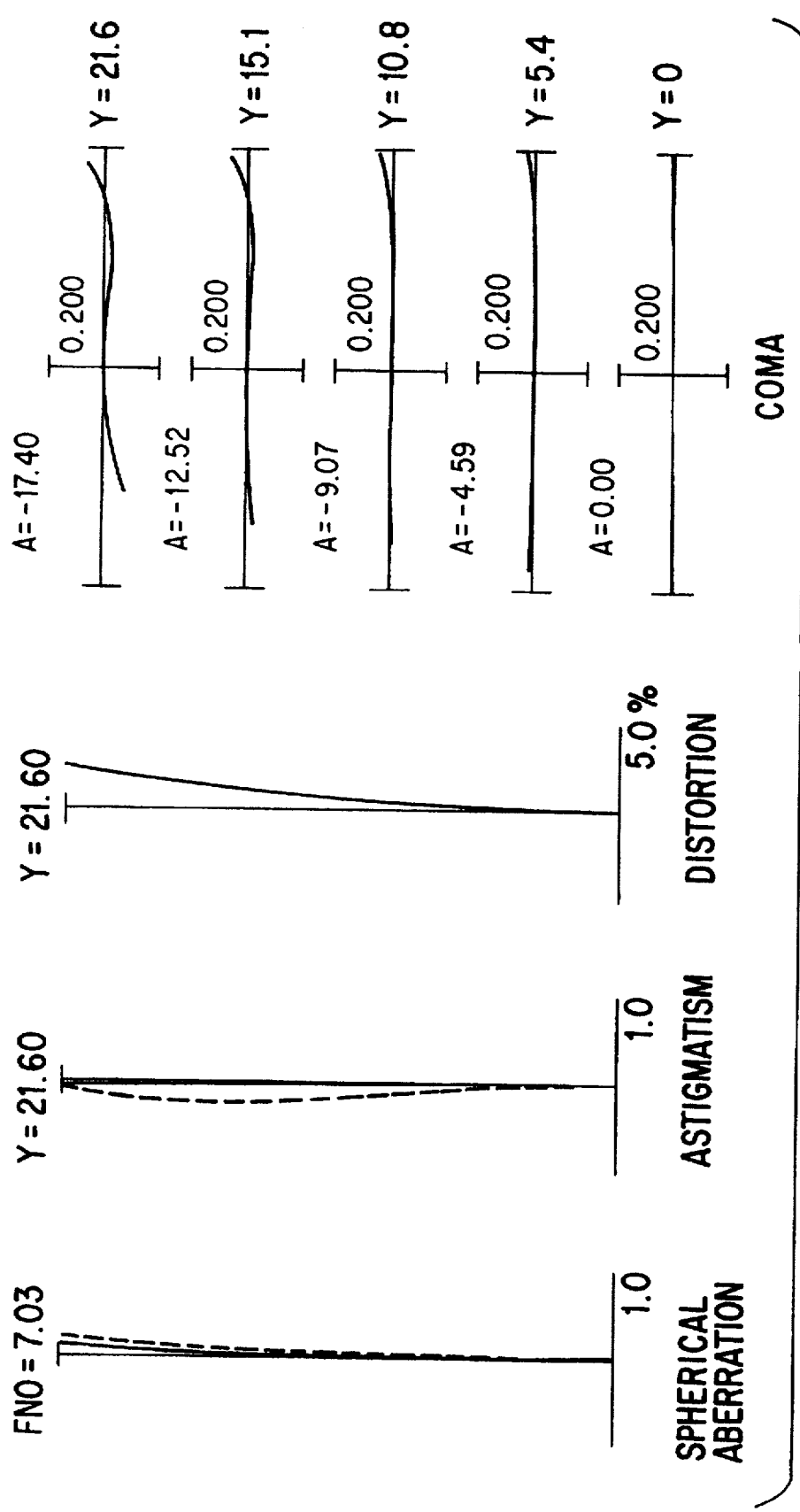
FIG. 6 shows the various aberrations for the infinite focus state at maximum telephoto state in the first embodiment.
Figure 7:
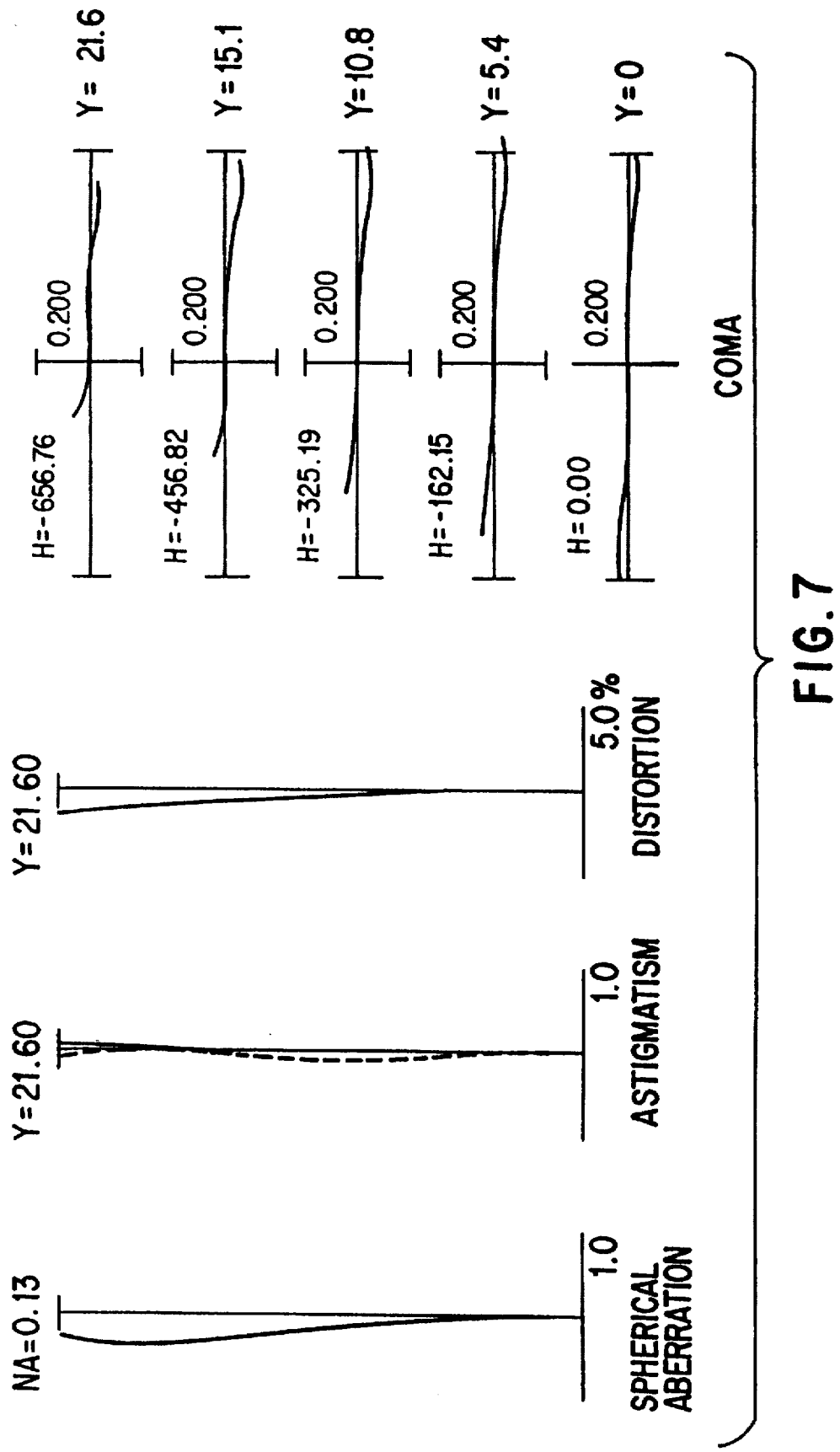
FIG. 7 shows the various aberrations for the close-distance focus state at maximum wide-angle state in the first embodiment.
Figure 8:
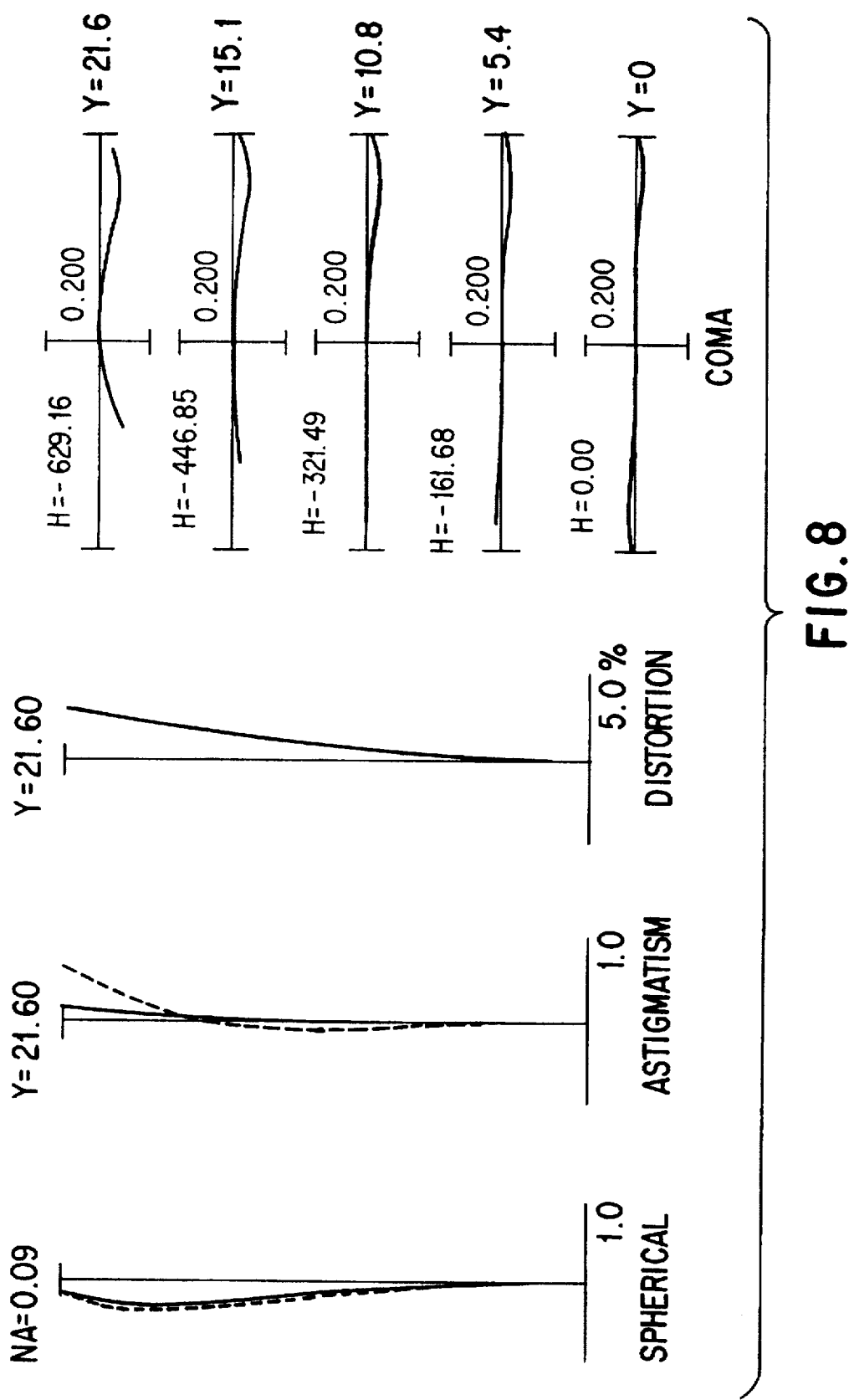
FIG. 8 shows the various aberrations for the close-distance focus state at intermediate focal length in the first embodiment.
Figure 9:
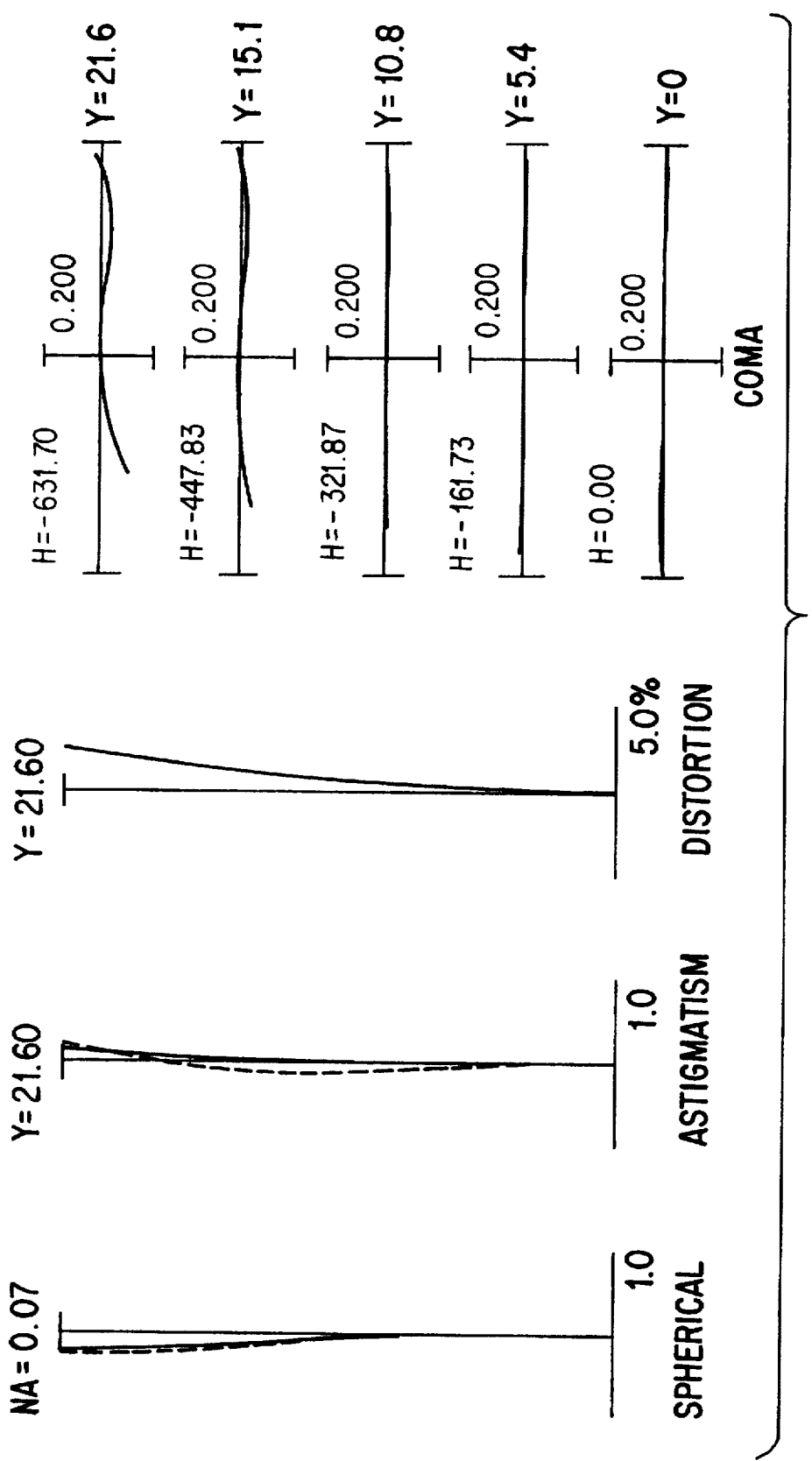
FIG. 9 shows the various aberrations for the close-distance focus state at maximum telephoto state in the first embodiment.

FIG. 3 shows the structure of a zoom lens in a first embodiment of the present invention.

The zoom lens shown in FIG. 3 comprises, in order from the object side, a first lens group G1 including negative meniscus lens L11 with the convex surface facing the object side, a negative meniscus lens L12 with the convex surface facing the object side, and a positive meniscus lens L13 with the convex surface facing the object side. Adjacent first lens group G1 is second lens group G2. The second lens group G2 comprises a first lens subgroup G2a on the object side and a second lens subgroup G2b on the image side. The first lens subgroup G2a includes a first lens unit G2a₂ on the object side and a second lens unit G2a₂ on the image side. The first lens unit G2a₁ includes biconvex lens L21. The second lens unit G2a₂ includes a cemented positive lens L22 having a biconvex lens and a negative meniscus lens with the concave surface facing the object side, a biconcave lens L23, and a biconvex lens L24. The second lens subgroup G2b includes a positive meniscus lens L25 with the concave surface facing the object side and a negative meniscus lens L26 with the concave surface facing the object side.

FIG. 3 shows the positional relationship of each lens group at the maximum wide-angle state. The lens groups move on the optical axis along the zoom locus shown by the arrow in FIG. 1 during zooming to maximum telephoto state.

Moreover, an aperture-stop S is provided between the first lens subgroup G2a and the second lens subgroup G2b.

The values of various dimensions of embodiment 1 of the present invention are listed in Table (1) below. In Table (1), f denotes focal length, FNO denotes F-number, 2ω denotes field angle, and Bf denotes back focus. Moreover, the refractive indices and Abbe numbers are the values corresponding to a d-line (λ=587.6 nm). The aperture ratio at the infinite focus state is defined by F-number (FNO). In addition, the surface numbers indicate the order of the lens surfaces along the direction in which the light rays move.

TABLE 1 f = 28.80–47.37–67.21 mm
FNO = 3.97–5.43–7.00
2ω = 74.69–47.80–34.80°

| Surface Number | Radius of Curvature | Intersurface Distance | Abbe Number | Refractive Index |
|---|---|---|---|---|
| 1 | 63.3724 | 1.408 | 45.37 | 1.79668 |
| 2 | 17.7251 | 3.456 | | |
| 3 | 43.0885 | 1.280 | 45.37 | 1.79668 |
| 4 | 22.3649 | 2.304 | | |
| 5 | 20.8322 | 3.840 | 27.61 | 1.75520 |
| 6 | 48.3638 | (d6 = variable) | | |
| 7 | 23.4195 | 2.560 | 60.14 | 1.62041 |
| 8 | −1538.6685 | 1.920 | | |
| 9 | 16.8352 | 4.480 | 61.09 | 1.58913 |
| 10 | −21.9271 | 1.920 | 25.50 | 1.80458 |
| 11 | −78.5857 | 0.640 | | |
| 12 | −27.1640 | 1.280 | 33.89 | 1.80384 |
| 13 | 19.6950 | 0.640 | | |
| 14 | 32.7790 | 2.304 | 35.70 | 1.62588 |
| 15 | −18.1778 | 0.640 | | |
| 16 | ∞ | 4.480 | (aperture stop) | |
| 17 | −21.8111 | 2.304 | 27.61 | 1.75520 |
| 18 | −15.9148 | 4.480 | | |
| 19 | −10.1409 | 1.536 | 45.37 | 1.79668 |
| 20 | −27.8518 | (Bf) | | |

(variable space for zooming)
f    28.8095  47.3720  67.2116
d6   19.9552  7.5865   1.9200
Bf   18.9477  30.3564  42.5501
(values corresponding to conditions)
f1 = −38.4656
f2 = 23.6414
f2a = 22.0661
f2b = −30.8872
(1) Bfw/fw = 0.658
(2) $|f1|/(fw \times ft)^{1/2}$ = 0.874
(3) $f2a/|f2b|$ = 0.714
(4) f2b/f1 = 0.803
(5) $f2/(fw \times ft)^{1/2}$ = 0.541
(focussing displacement of lens group G2b at photographic magnification of −1/30)
f             28.8095  47.3720  67.2116
displacement  0.4109   0.4260   0.4094
(Here, the direction of movement from the image side to the object side is taken as positive)
(values corresponding to conditions)
$f2a_2$ = 45.7407
(6) $B2a_2 t$ = 0.243
(7) $f2a_2/(fw \times ft)^{1/2}$ = 1.039
(8) $|f2b|/fw$ = 1.072

FIGS. 4 through 9 show various aberration diagrams for the first embodiment, and are respectively various aberration diagrams for the infinite focus state at maximum wide-angle state (shortest focal length state), various aberration diagrams for the infinite focus state at intermediate focal length state, various aberration diagrams for the infinite focus state at maximum telephoto state (longest focal length state), various aberration diagrams at a close-distance focus state (a photographic magnification of −1/30) at the maximum wide-angle state, various aberration diagrams at a close-distance focussing state (photographic magnification of −1/30) at a intermediate focal length state, and various aberration diagrams at a close-distance focussing state (photographic magnification of −1/30) at the maximum telephoto state.

In each aberration diagram, FNO denotes F-number, NA denotes numerical aperture, Y denotes image height, A denotes field angle with respect to each image height, and H denotes the object height with respect to each image height, respectively.

Moreover, in the aberration diagram describing astigmatism, the solid line represents the sagittal image plane while the broken line represents the meridional image plane. Furthermore, in the aberration diagram describing spherical aberration, the broken line represents the sine condition.

Each aberration diagram clearly shows that various aberrations are favorably corrected at each focal length condition from infinite focus state to close distance focus state in the present invention.

Figure 10:
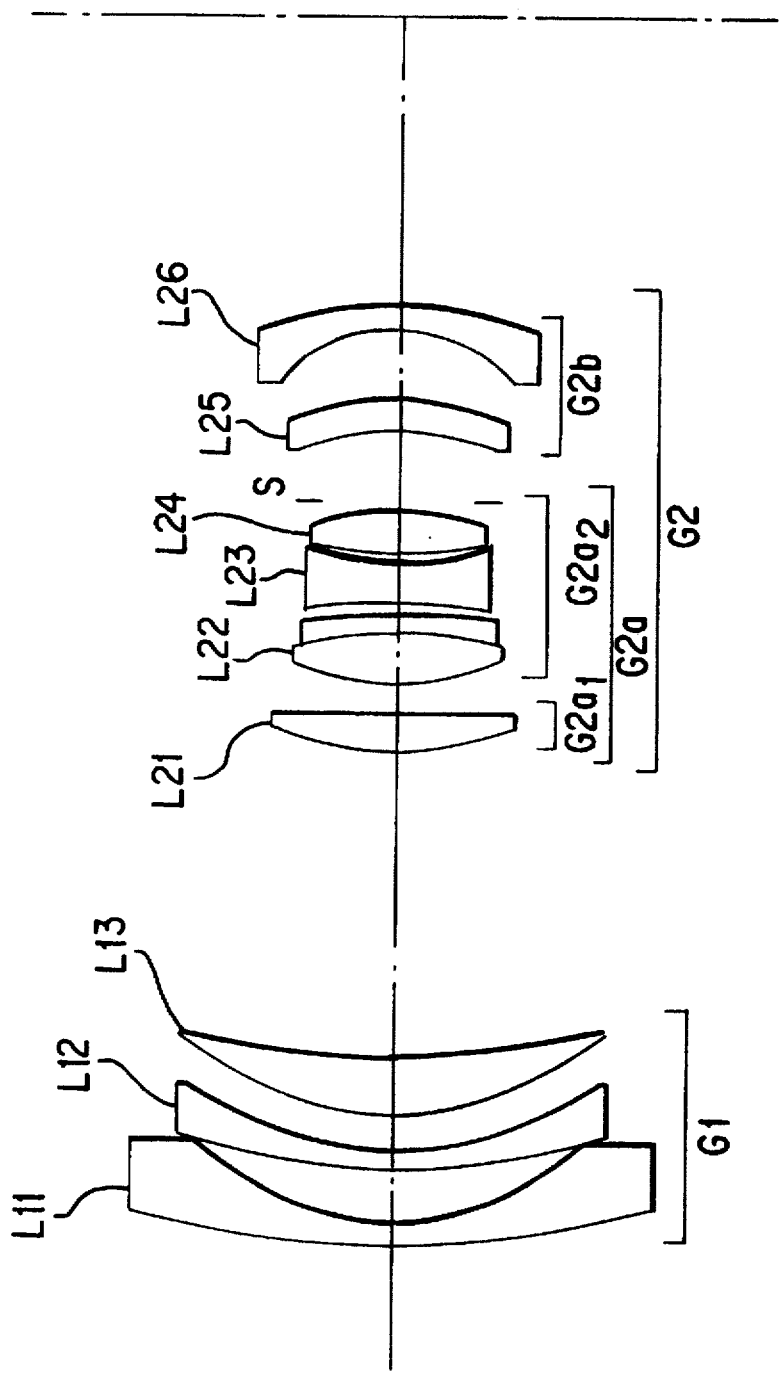
FIG. 10 shows the structure of a zoom lens according to the second embodiment of the present invention.
Figure 11:
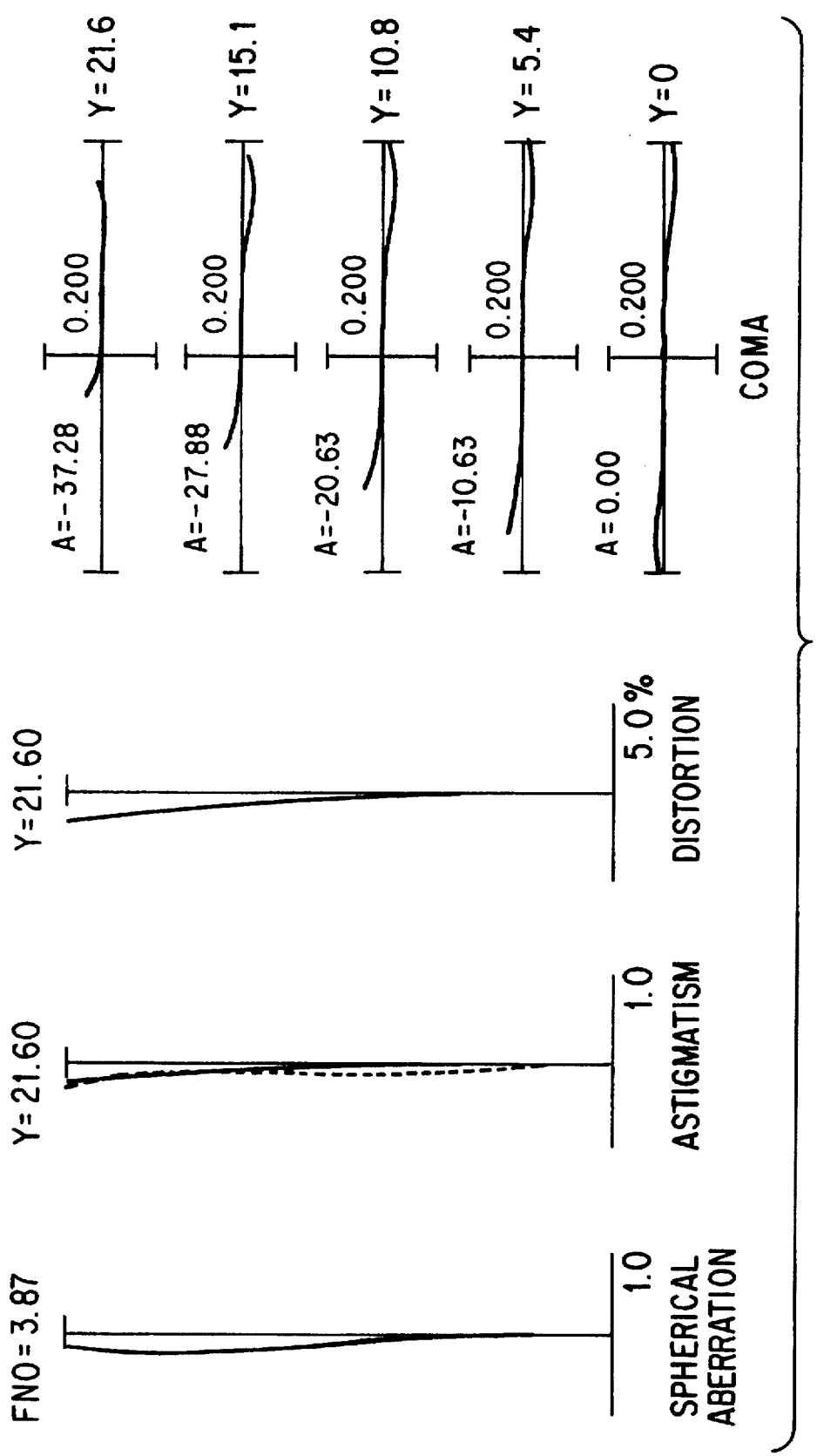
FIG. 11 shows various aberrations for the infinite focus state at maximum wide-angle state in the second embodiment.
Figure 12:
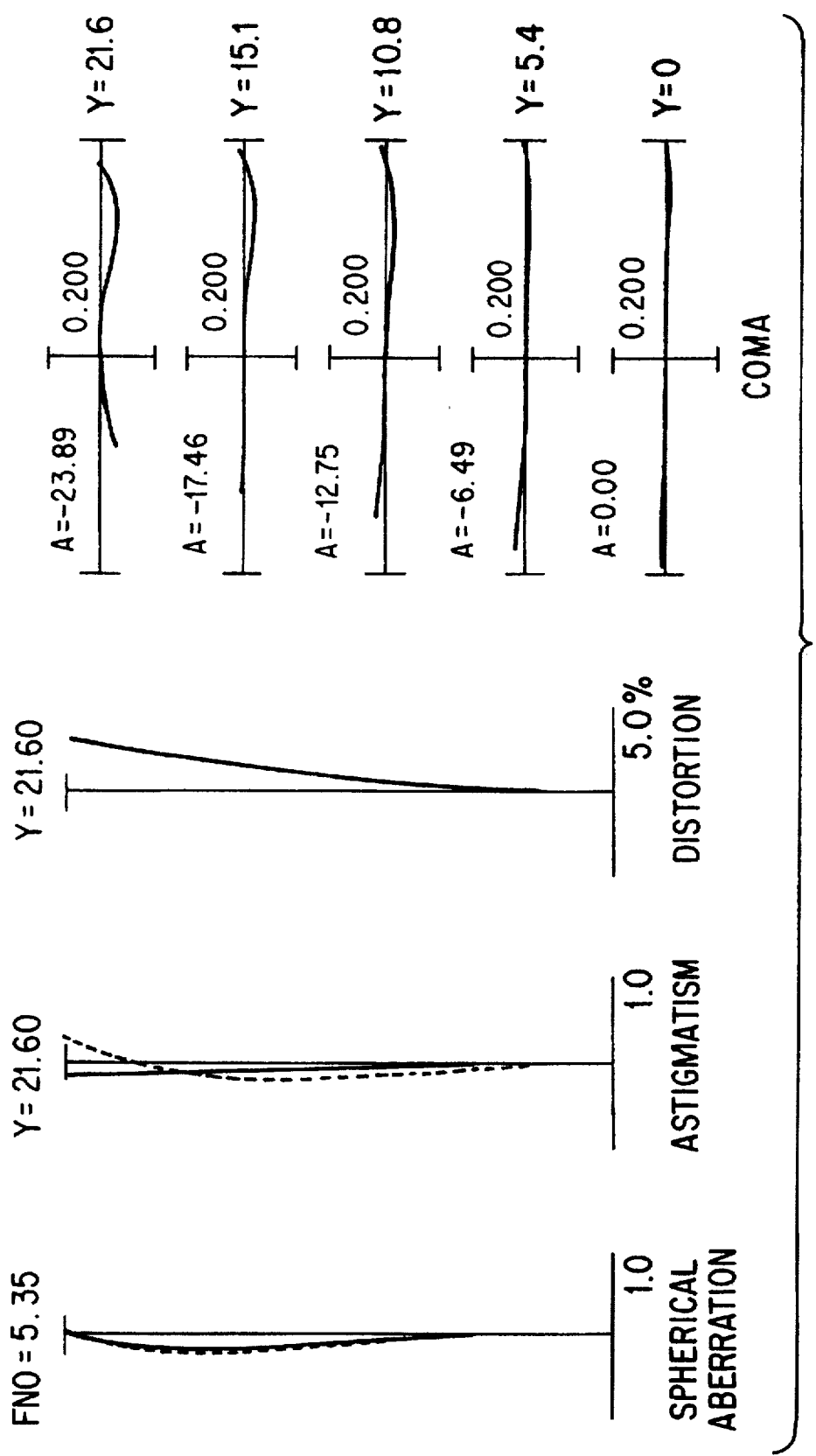
FIG. 12 shows the various aberrations for the infinite focus state at intermediate focal length state in the second embodiment.
Figure 13:
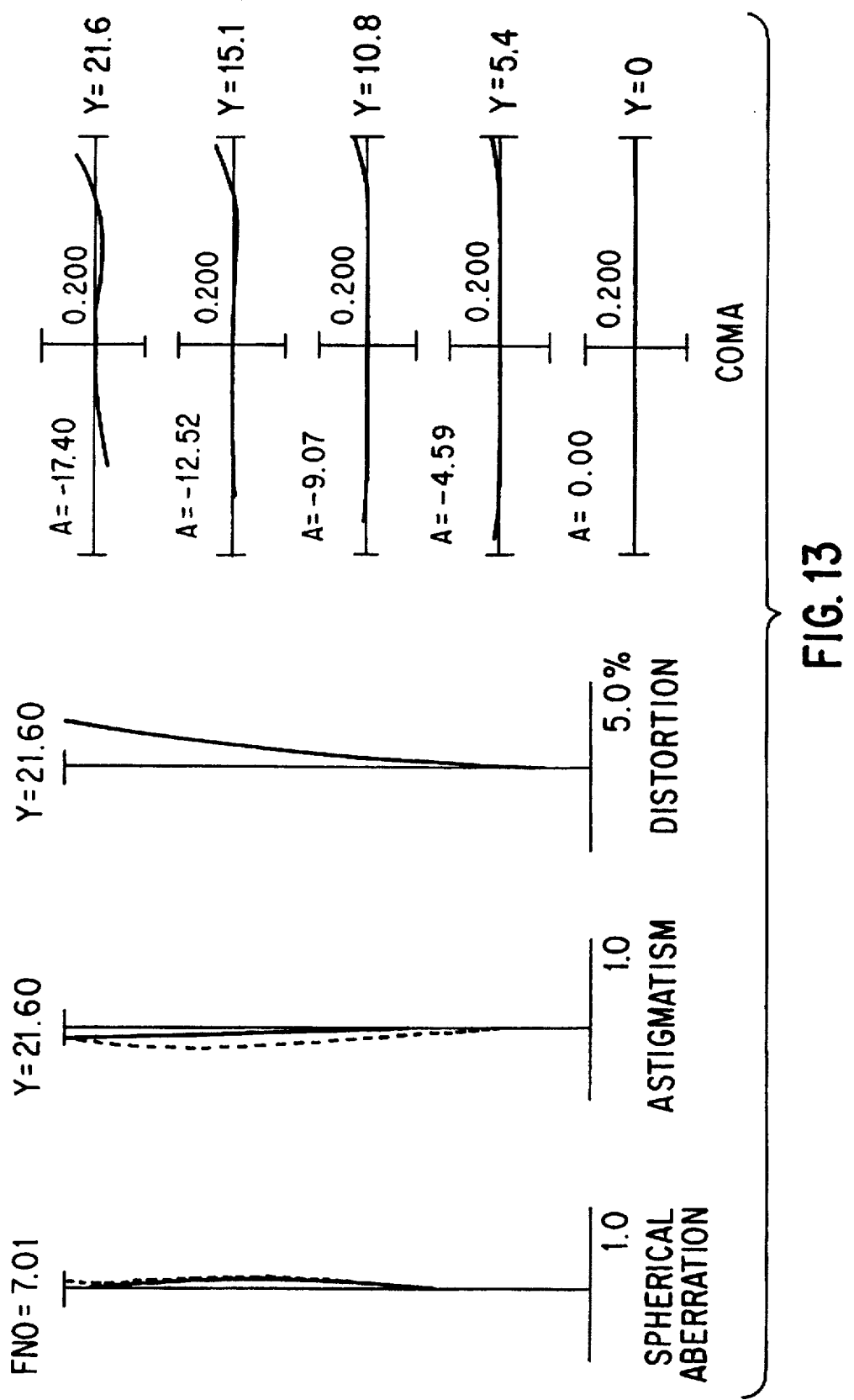
FIG. 13 shows the various aberrations for the infinite focus state at maximum telephoto state in the second embodiment.
Figure 14:
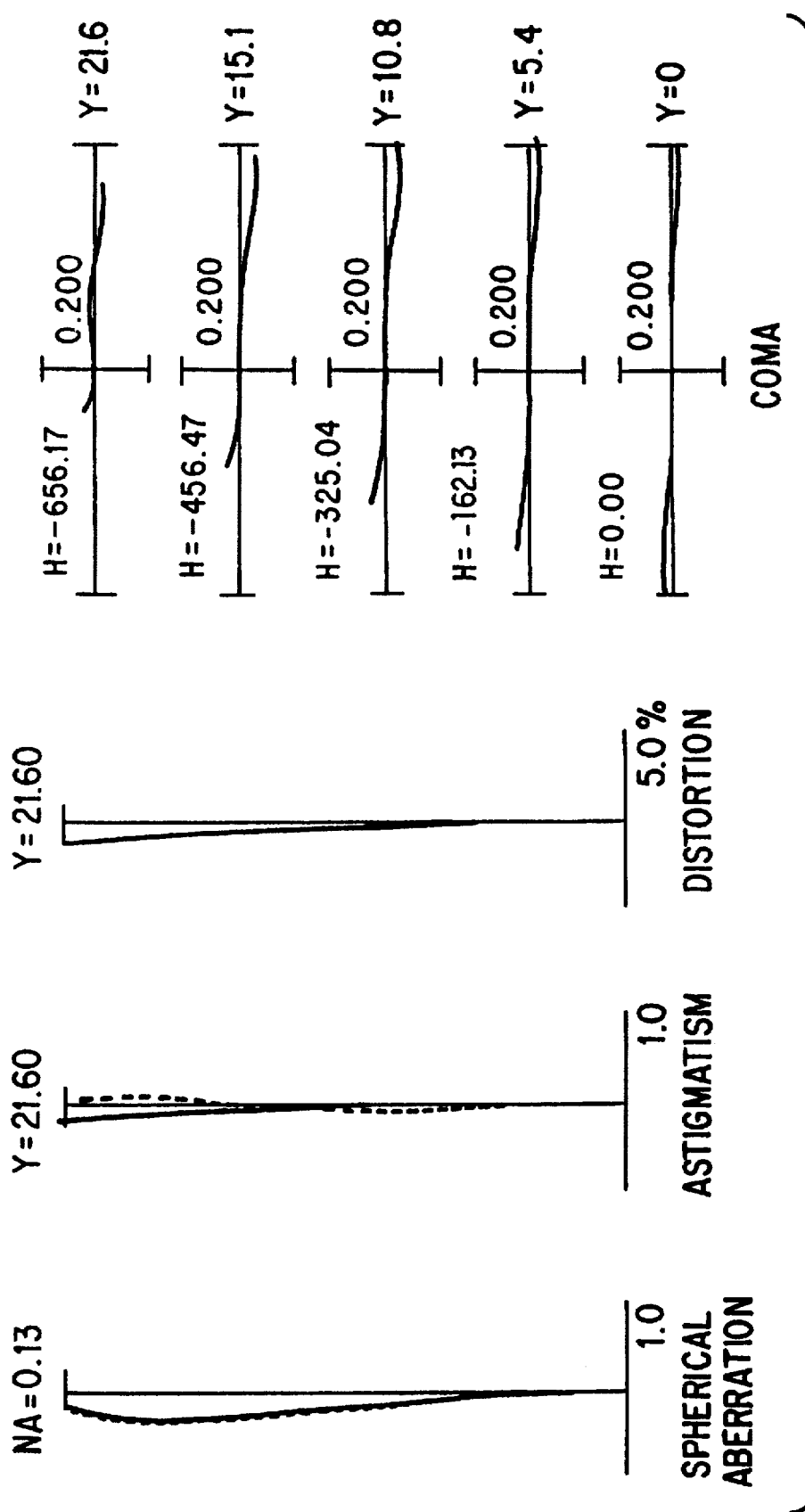
FIG. 14 shows the various aberrations for the close-distance focus state at maximum wide-angle state in the second embodiment.
Figure 15:
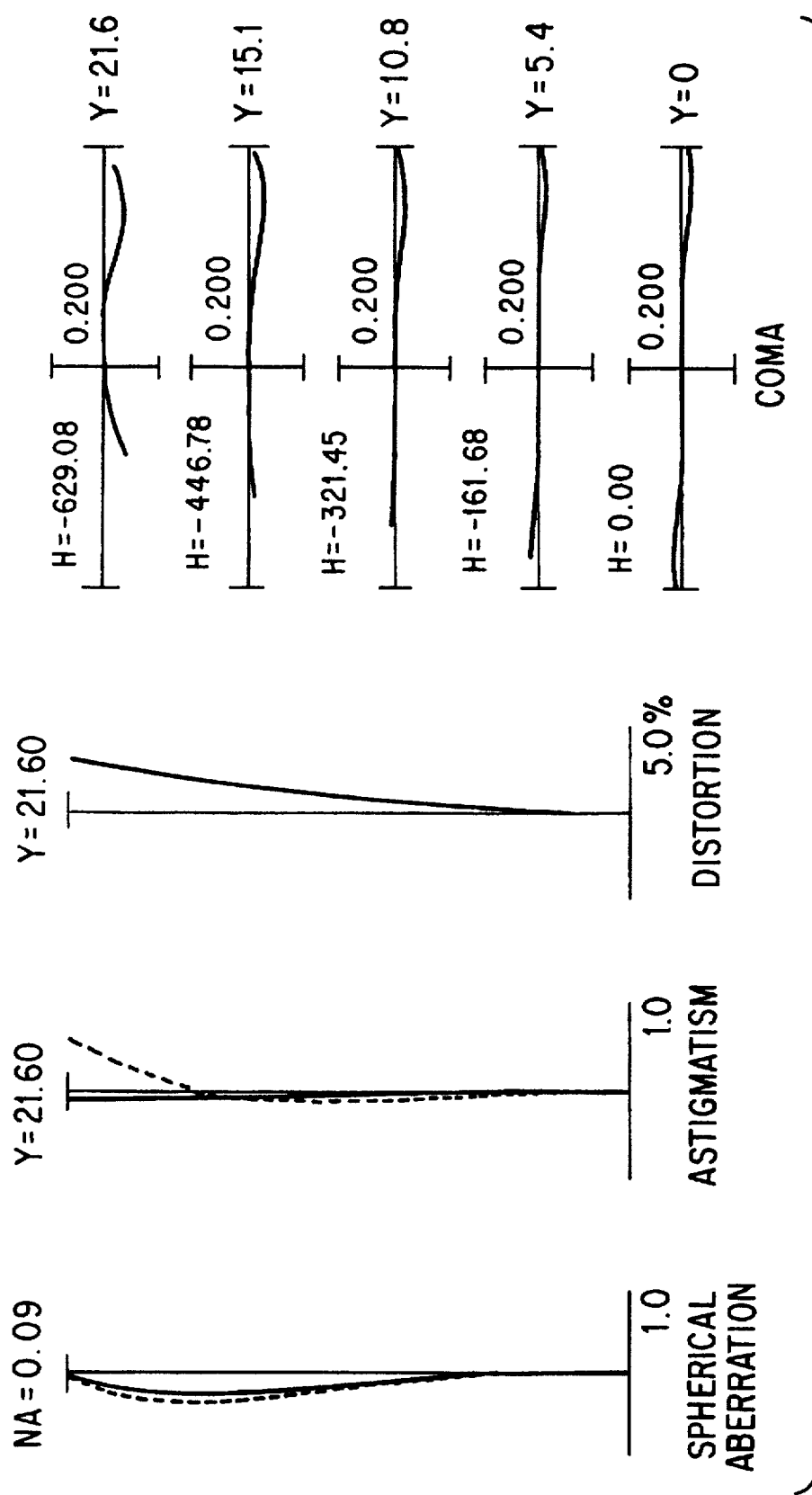
FIG. 15 shows the various aberrations for the close-distance focus state at intermediate focal length in the second embodiment.
Figure 16:
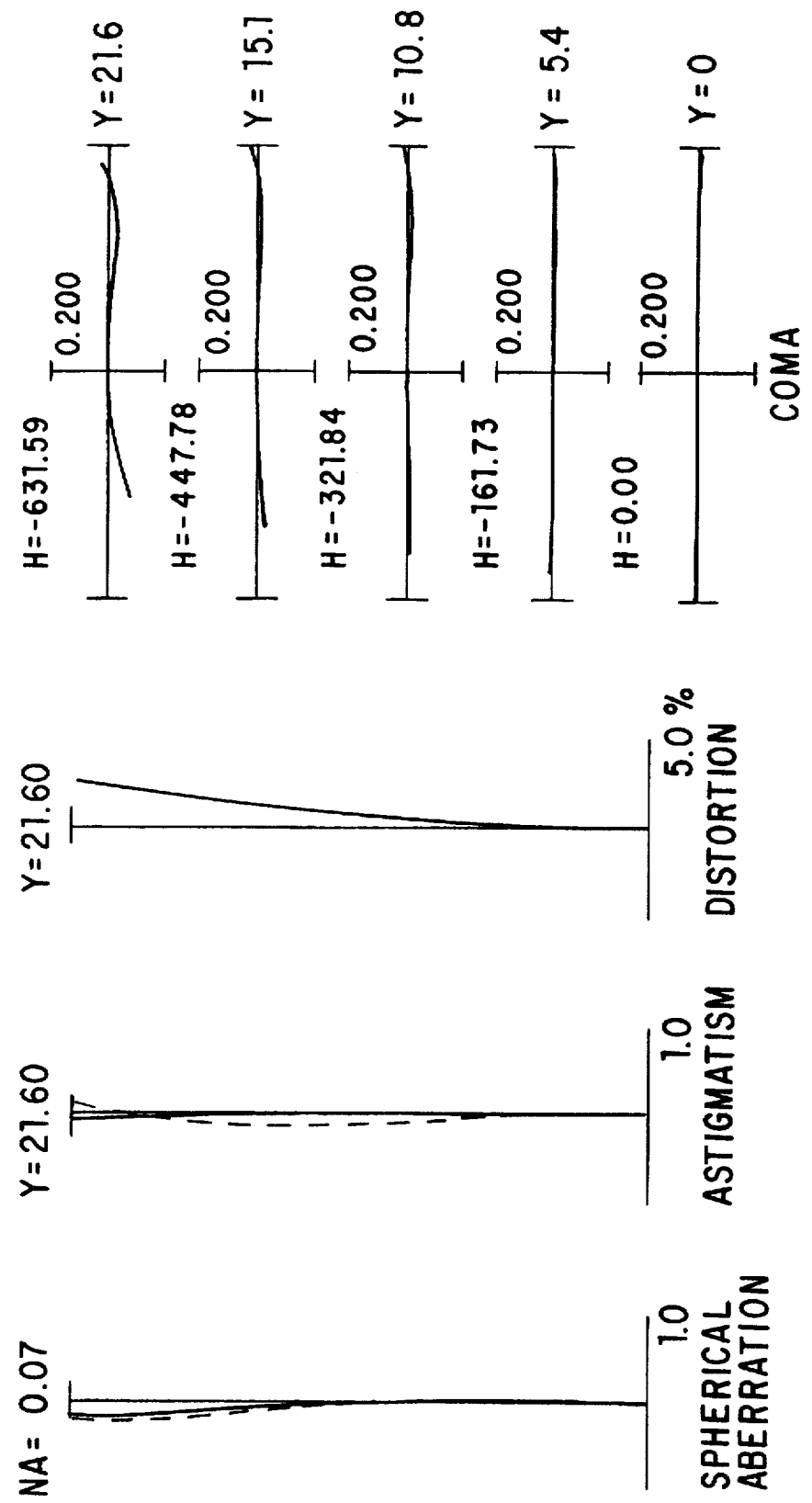
FIG. 16 shows the various aberrations for the close-distance focus state at maximum telephoto state in the second embodiment.

FIG. 10 shows the structure of a zoom lens of a second embodiment of the present invention.

The zoom lens shown in the figure comprises, in order from the object side, a first lens group G1 including of negative meniscus lens L11 with the convex surface facing the object side, a negative meniscus lens L12 with the convex surface facing the object side, and a positive meniscus lens L13 with the convex surface facing the object side. Adjacent first lens group G1 is second lens group G2. The second lens group G2 comprises a first lens subgroup G2a on the object side and a second lens subgroup G2b on the image side. The first lens subgroup, G2a includes a first lens unit $G2a_1$ on the object side and a second lens unit $G2a_2$ on the image side. The first lens unit $G2a_2$ includes biconvex lens L21. The second lens unit $G2a_2$ includes cemented positive lens L22 having a biconvex lens and a negative meniscus lens with the concave surface facing the object side, a biconcave lens L23 and a biconvex lens L24; and a second lens subgroup G2b includes a positive meniscus lens L25 with the concave surface facing the object side and a negative meniscus lens L26 with the concave surface facing the object side.

FIG. 10 shows the positional relationship of each lens group at the maximum wide-angle state. The lens groups move on the optical axis along the zoom locus shown by the arrow in FIG. 1 during zooming to maximum telephoto state.

Moreover, an aperture-stop S is provided between the lens subgroup G2a and the second lens subgroup G2b.

The values of various dimensions of the second embodiment of the present invention are listed in Table (2) below. In Table (2), f denotes focal length, FNO denotes F-number, 2ω denotes field angle, and Bf denotes back focus. Moreover, the refractive indices and Abbe numbers are the values corresponding to a d-line (λ=587.6 nm). The aperture ratio at the infinite focus state is defined by F-number (FNO) and numerical aperture (NA). In addition, the surface numbers indicate the order of the lens surfaces along the direction in which the light rays move.

TABLE 2 f = 28.81–47.37–67.20 mm
FNO = 3.87–5.35–7.01
2ω = 74.56–47.78–34.80°

| Surface Number | Radius of Curvature | Intersurface Distance | Abbe Number | Refractive Index |
|---|---|---|---|---|
| 1 | 66.2140 | 1.408 | 45.37 | 1.79668 |
| 2 | 18.0261 | 3.456 | | |
| 3 | 44.7314 | 1.280 | 45.37 | 1.79668 |
| 4 | 22.9482 | 2.304 | | |
| 5 | 21.1664 | 3.840 | 27.61 | 1.75520 |
| 6 | 50.1451 | (d6 = variable) | | |
| 7 | 20.3433 | 2.560 | 60.14 | 1.62041 |
| 8 | −331.3322 | 1.920 | | |
| 9 | 17.0517 | 3.444 | 56.05 | 1.56883 |
| 10 | −20.4000 | 1.024 | 23.01 | 1.86074 |
| 11 | −199.8006 | 0.640 | | |
| 12 | −41.9971 | 2.822 | 44.52 | 1.81554 |
| 13 | 18.4345 | 0.640 | | |

TABLE 2-continued

| 14 | 28.2070 | 2.594 | 38.18 | 1.65128 |
|----|---------|-------|-------|---------|
| 15 | −19.3152 | 0.640 | | |
| 16 | ∞ | 4.480 | (aperture stop) | |
| 17 | −18.3092 | 2.304 | 27.61 | 1.75520 |
| 18 | −15.2373 | 4.480 | | |
| 19 | −10.0186 | 1.536 | 45.37 | 1.79668 |
| 20 | −26.7910 | (Bf) | | |

(variable space for zooming)
f    28.8102  47.3674  67.1964
d6   20.1561  7.6496   1.9200
Bf   18.4286  29.6191  41.5765
(values corresponding to conditions)
f1 = −39.0533
f2 = 23.5501
f2a = 21.3488
f2b = −26.8279
(1) Bfw/fw = 0.640
(2) lf1l/(fw × ft)$^{1/2}$ = 0.888
(3) f2a/lf2bl = 0.796
(4) f2b/f1 = 0.687
(5) f2/(fw × ft)$^{1/2}$ = 0.535
(focussing displacement of lens group G2b at photographic magnification of −1/30)
f             28.8102   47.3674   67.1964
displacement  0.4229    0.3645    0.3943
(Here, the direction of movement from the image side to the object side is taken as positive)
(values corresponding to conditions)
f2a$_2$ = 51.1152
f2b = −26.8279
(6) B2a$_x$t = 0.414
(7) f2a$_2$/(fw × ft)$^{1/2}$ = 1.162
(8) lf2bl/fw = 0.931

FIGS. 11 through 16 show various aberration diagrams for the second embodiment, and are respectively: various aberration diagrams for the infinite focus state at maximum wide-angle state, various aberration diagrams for the infinite focus state at intermediate focal length state, various aberration diagrams for the infinite focus state at maximum telephoto state, various aberration diagrams at a close-distance focus state (a photographic magnification of −1/30) at the maximum wide-angle state, various aberration diagrams at a close-distance focussing state (photographic magnification of −1/30) at an intermediate focal length state, and various aberration diagrams at a close-distance focussing state (photographic magnification of −1/30) at the maximum telephoto state.

In each aberration diagram, FNO denotes F-number, NA denotes numerical aperture, Y denotes image height, A denotes field angle with respect to each image height, and H denotes the object height with respect to each image height, respectively. Moreover, in the aberration diagram describing astigmatism, the solid line represents the sagittal image plane while the broken line represents the meridional image plane. Furthermore, in the aberration diagram describing spherical aberration, the broken line represents the sine condition.

Each aberration diagram clearly shows that various aberrations are favorably corrected at each focal length condition and at each photographic distance condition in the present invention.

Figure 17:
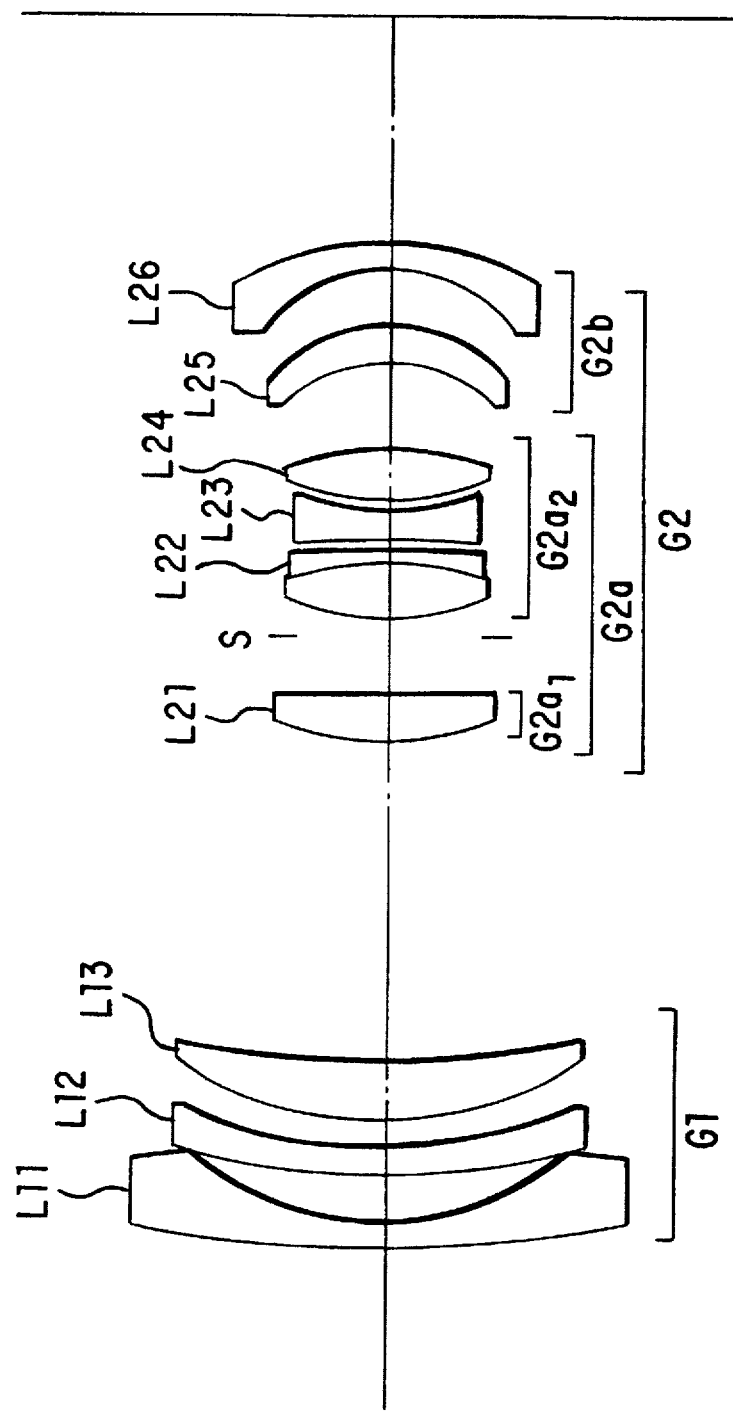
FIG. 17 shows the structure of a zoom lens according to the third embodiment of the present invention.
Figure 18:
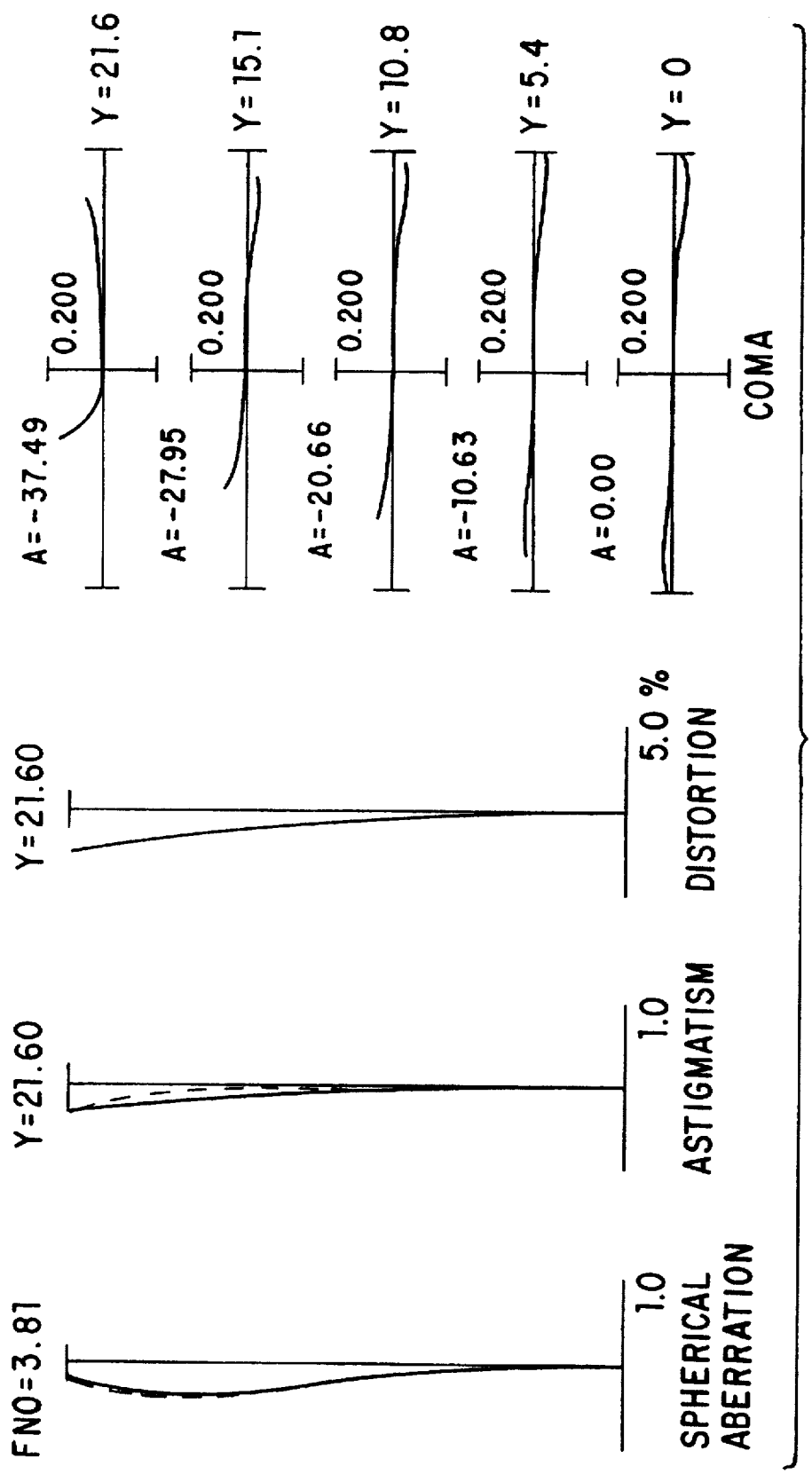
FIG. 18 shows various aberrations for the infinite focus state at maximum wide-angle state in the third embodiment.
Figure 19:
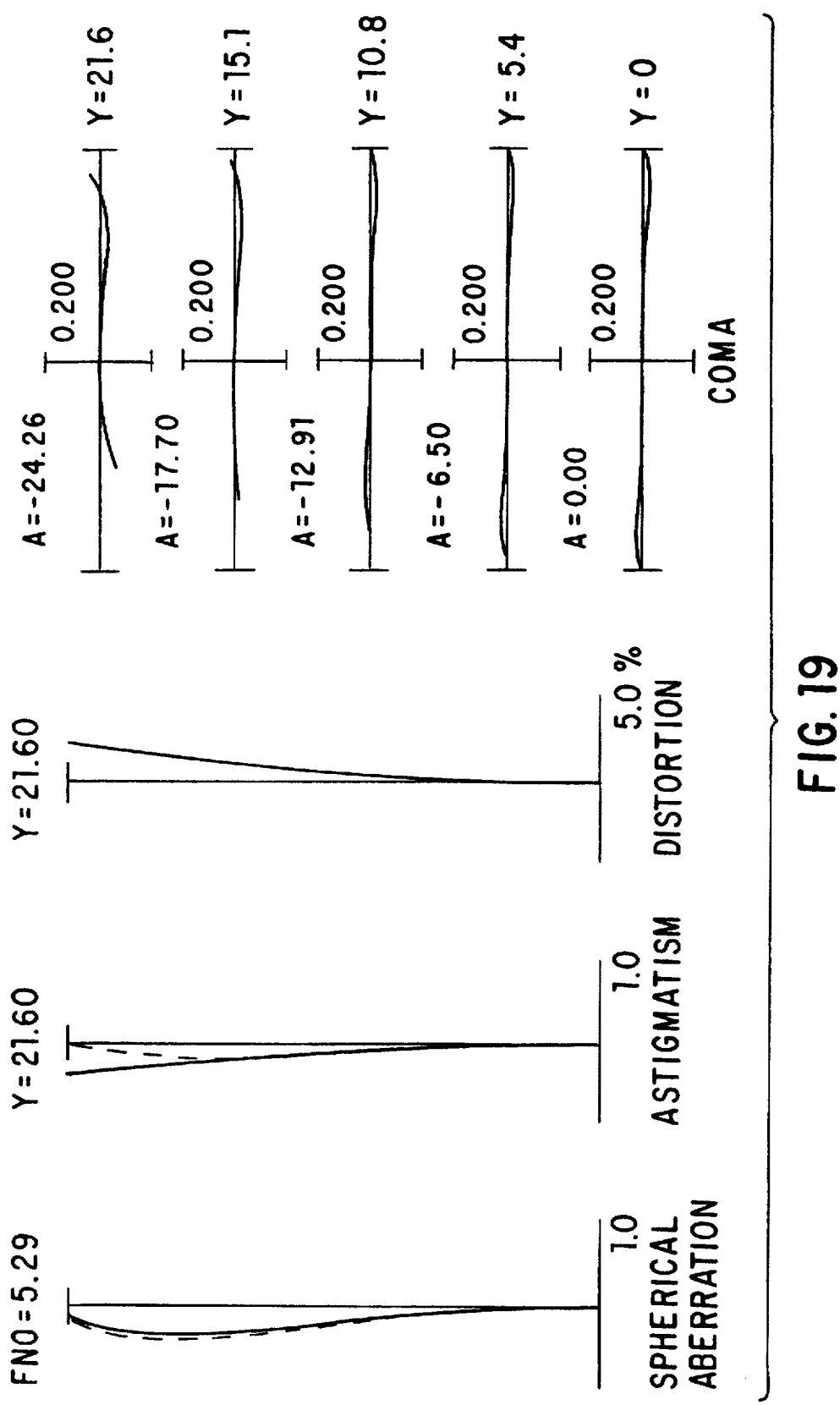
FIG. 19 shows the various aberrations for the infinite focus state at intermediate focal length state in the third embodiment.
Figure 20:
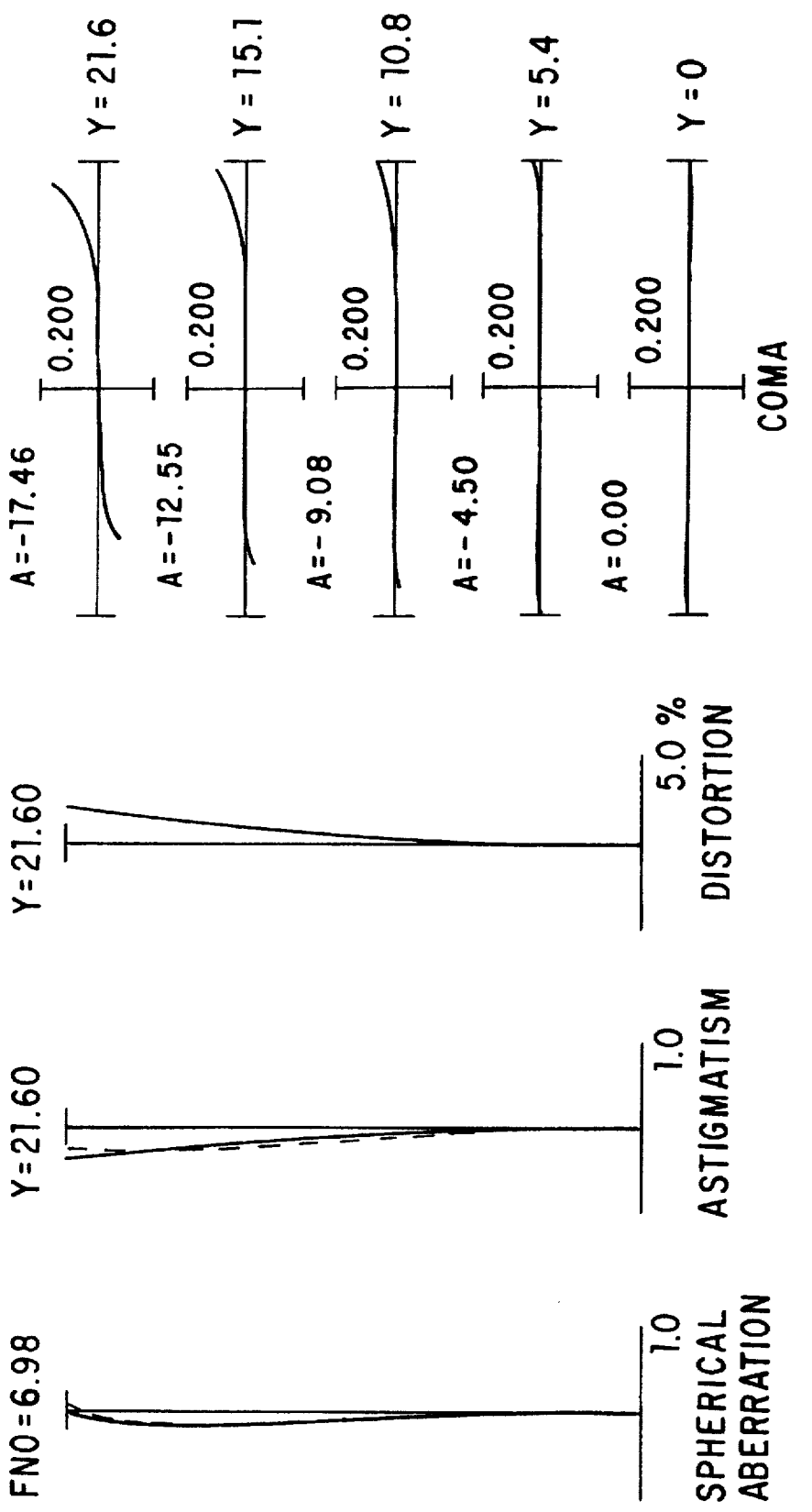
FIG. 20 shows the various aberrations for the infinite focus state at maximum telephoto state in the third embodiment.
Figure 21:
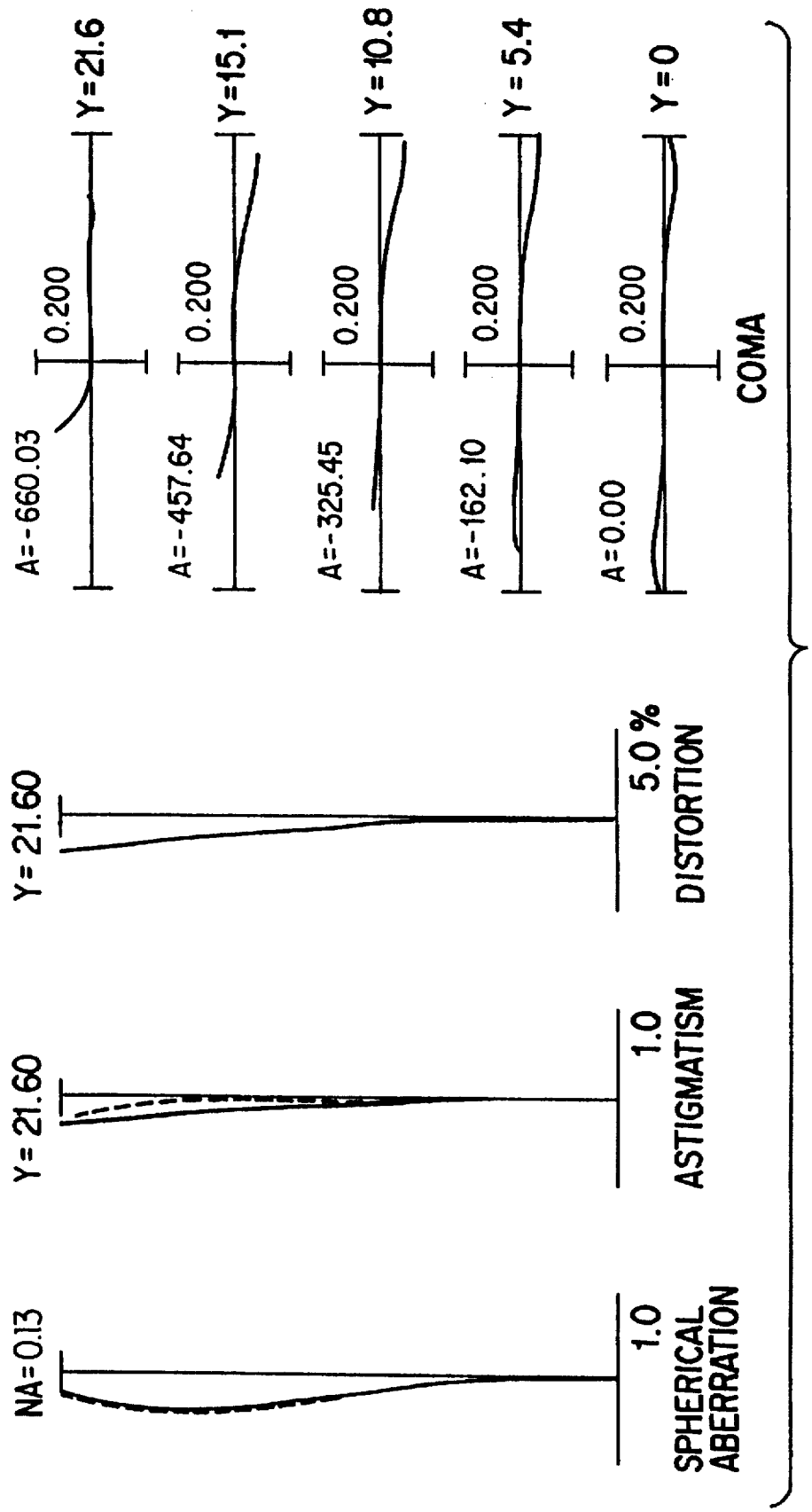
FIG. 21 shows the various aberrations for the close-distance focus state at maximum wide-angle state in the third embodiment.
Figure 22:
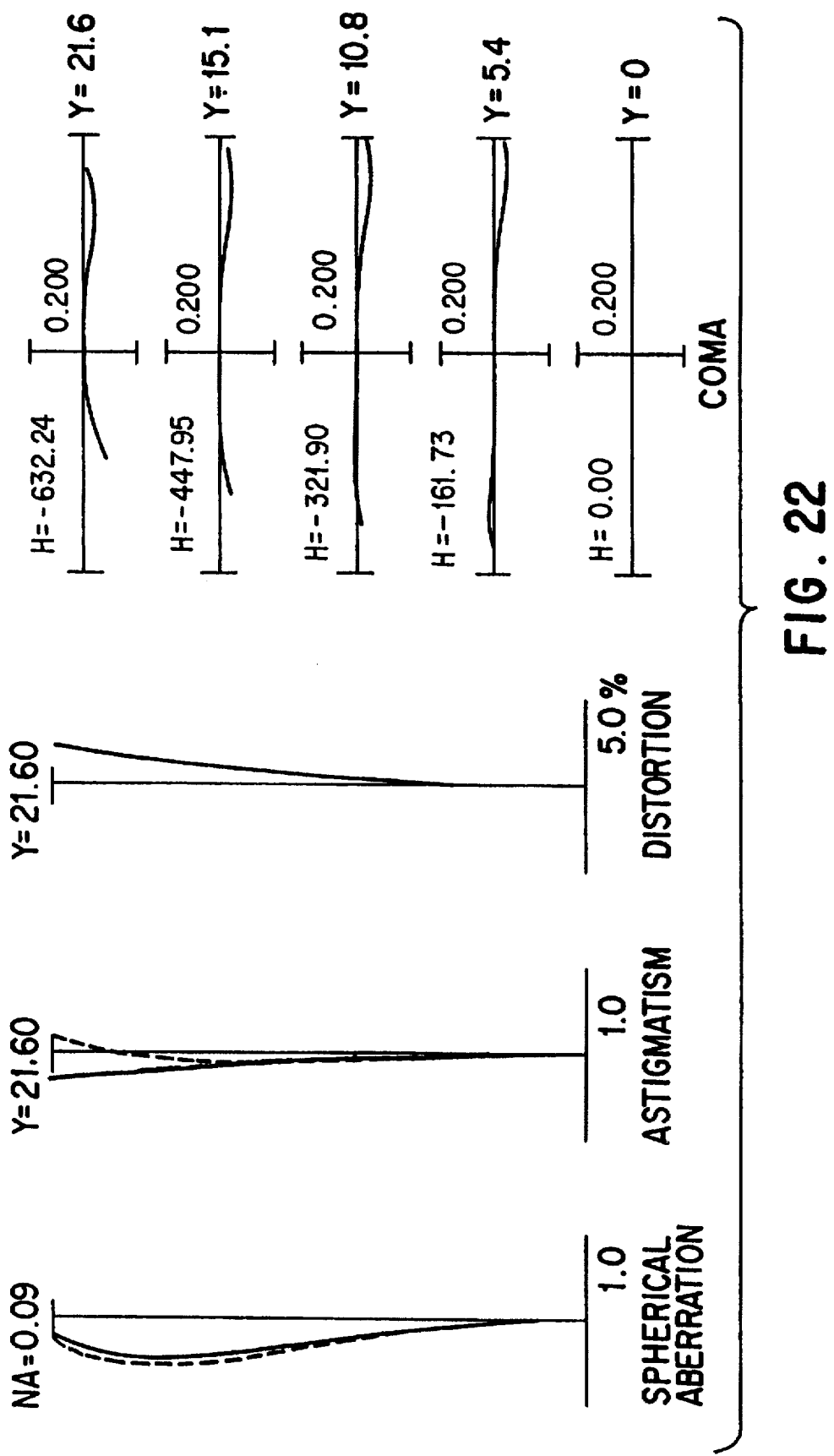
FIG. 22 shows the various aberrations for the close-distance focus state at intermediate focal length in the third embodiment.
Figure 23:
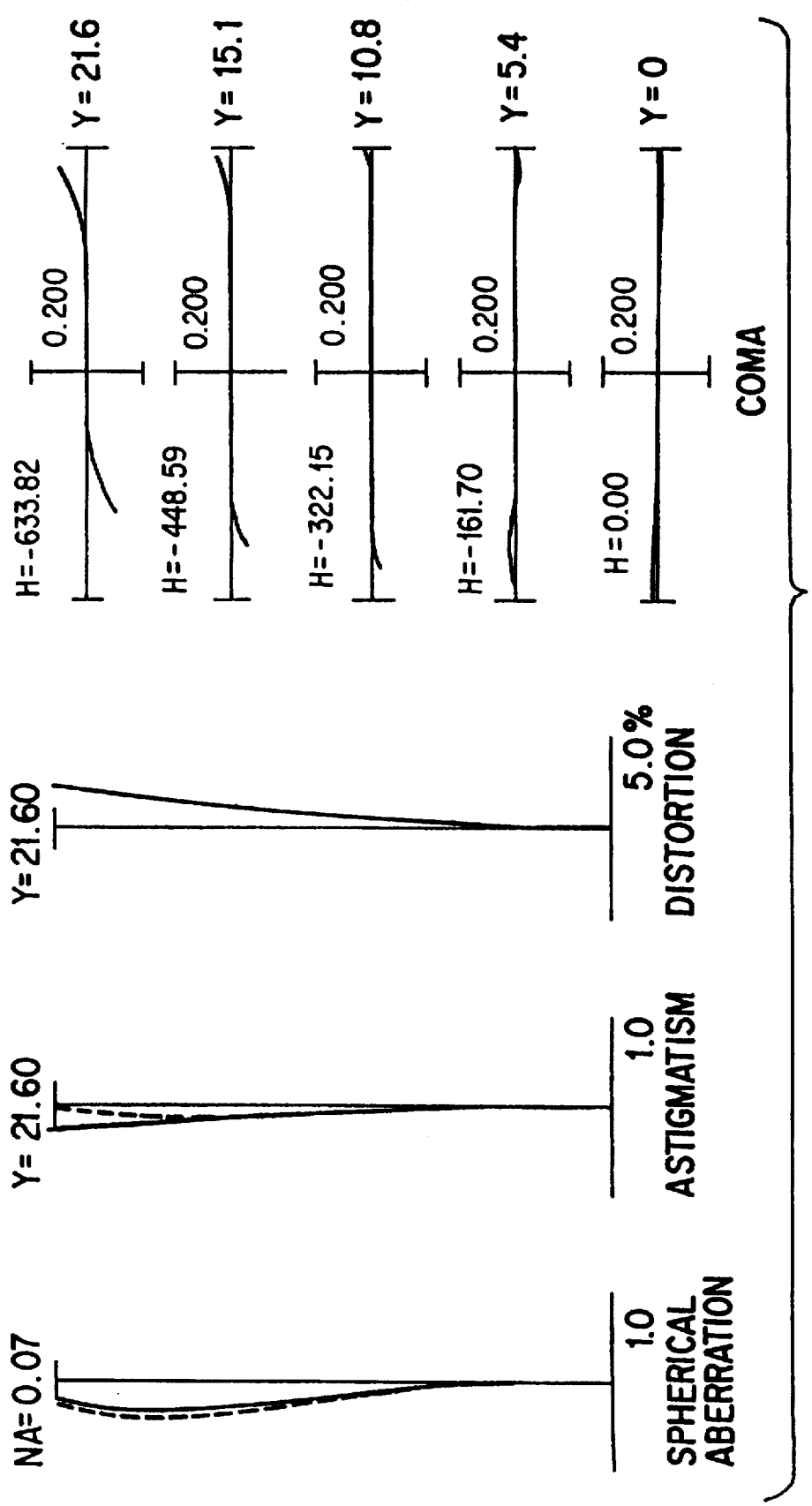
FIG. 23 shows the various aberrations for the close-distance focus state at maximum telephoto state in the third embodiment.

FIG. 17 shows the structure of a zoom lens in a third embodiment of the present invention.

The zoom lens shown in the figure comprises, in order from the object side, a first lens group G1 consisting of negative meniscus lens L11 with the convex surface facing the object side, a negative meniscus lens L12 with the convex surface facing the object side, and a positive meniscus lens L13 with the convex surface facing the object side. Adjacent first lens group G1 is second lens group G2. The second lens group G2 comprises a first lens subgroup G2a on the object side and a second lens subgroup G2b on the image side. The first lens subgroup G2a includes a first lens unit G2a$_1$ on the object side and a second lens unit G2a$_2$ on the image side. The first lens unit G2a$_1$ includes biconvex lens L21. The cemented positive lens L22 having a biconvex lens and a biconcave lens, a biconcave lens L23, and a biconvex lens L24. Second lens subgroup G2b includes a positive meniscus lens L25 with the concave surface facing the object side, and a negative meniscus lens L26 with the concave surface facing the object side.

FIG. 17 shows the positional relationship of each lens group at the maximum wide-angle state. The lens groups move on the optical axis along the zoom locus shown by the arrow in FIG. 1 during zooming to maximum telephoto state.

Moreover, an aperture-stop S is provided between the lens subgroup G2a and the lens subgroup G2b.

The values of various dimensions of embodiment 3 of the present invention are listed in Table (3) below. In Table (3), f denotes focal length, FNO denotes F-number, 2ω denotes field angle, and Bf denotes back focus. Moreover, the refractive indices and Abbe numbers are the values corresponding to a d-line (λ=587.6 nm). The aperture ratio at the infinite focus state is defined by F-number (FNO) and numerical aperture (NA). In addition, the surface numbers indicate the order of the lens surfaces along the direction in which the light rays move.

TABLE 3 f = 28.80–46.52–67.20 mm
FNO = 4.05–5.40–6.95
2ω= 77.50–49.42–35.14°

| Surface Number | Radius of Curvature | Intersurface Distance | Abbe Number | Refractive Index |
|----|----------|----------|--------|---------|
| 1  | 99.2669  | 1.408    | 45.37  | 1.79668 |
| 2  | 17.6485  | 3.840    |        |         |
| 3  | 60.8589  | 1.280    | 43.35  | 1.84042 |
| 4  | 32.2218  | 1.920    |        |         |
| 5  | 23.5811  | 3.840    | 27.61  | 1.75520 |
| 6  | 64.1920  | (d6 = variable) | | |
| 7  | 19.8011  | 2.560    | 60.14  | 1.62041 |
| 8  | −435.6789 | 3.840   |        |         |
| 9  | ∞        | 1.280    | (aperture stop) | |
| 10 | 14.9697  | 3.456    | 59.60  | 1.53996 |
| 11 | −23.1114 | 1.024    | 23.01  | 1.86074 |
| 12 | 1830.0156 | 0.640   |        |         |
| 13 | −40.4057 | 1.920    | 43.35  | 1.84042 |
| 14 | 13.8199  | 0.640    |        |         |
| 15 | 17.2987  | 3.200    | 38.18  | 1.65128 |
| 16 | −17.7363 | 5.760    |        |         |
| 17 | −9.9014  | 2.304    | 45.00  | 1.74400 |
| 18 | −9.8358  | 3.840    |        |         |
| 19 | −9.8645  | 1.536    | 52.30  | 1.74810 |
| 20 | −21.6676 | (Bf)     |        |         |

(variable space for zooming)
f    28.7981  46.5206  67.1974
d6   21.1200  8.3200   1.9200
Bf   18.8985  30.6232  44.3023
(values corresponding to conditions)
f1 = −38.2437
f2 = 25.3009
f2a = 22.4405
f2b = −29.4847
(1) Bfw/fw = 0.656
(2) lf1l/(fw × ft)$^{1/2}$ = 869
(3) f2a/lf2bl = 0.761
(4) f2b/f1 = 0.771

TABLE 3-continued (5) $f2/(fw \times ft)^{1/2} = 0.575$
(focussing displacement of lens group G2a$_2$ at photographic magnification of $-1/30$)

| f | 28.7981 | 46.5206 | 67.1974 |
|---|---|---|---|
| displacement | 0.4310 | 0.4275 | 0.3970 |

(Here, the direction of movement from the image side to the object side is taken as positive)
(values corresponding to conditions)
f2a$_2$ = 50.5106
f2b = −29.4847
(6) B2a$_2$t = 0.437
(7) $f2a_2/(fw \times ft)^{1/2} = 1.148$
(8) |f2b|/fw = 1.024

FIGS. 18 through 23 show various aberration diagrams for the third embodiment, and are respectively: various aberration diagrams for the infinite focus state at maximum wide-angle state, various aberration diagrams for the infinite focus state at intermediate focal length state, various aberration diagrams for the infinite focus state at maximum telephoto state, various aberration diagrams at a close-distance focus state (a photographic magnification of −1/30) at the maximum wide-angle state, various aberration diagrams at a close-distance focussing state (photographic magnification of −1/30) at an intermediate focal length state, and various aberration diagrams at a close-distance focussing state (photographic magnification of −1/30) at the maximum telephoto state.

In each aberration diagram. FNO denotes F-number. NA denotes numerical aperture. Y denotes image height. A denotes field angle with respect to each image height, and H denotes the object height with respect to each image height, respectively.

Moreover, in the aberration diagram describing astigmatism, the solid line represents the sagittal image plane while the broken line represents the meridional image plane. Furthermore, in the aberration diagram describing spherical aberration, the broken line represents the sine condition.

Each aberration diagram clearly shows that various aberrations are favorably corrected at each focal length condition from infinite focus state to close distance focus state in the present invention.

Figure 24:
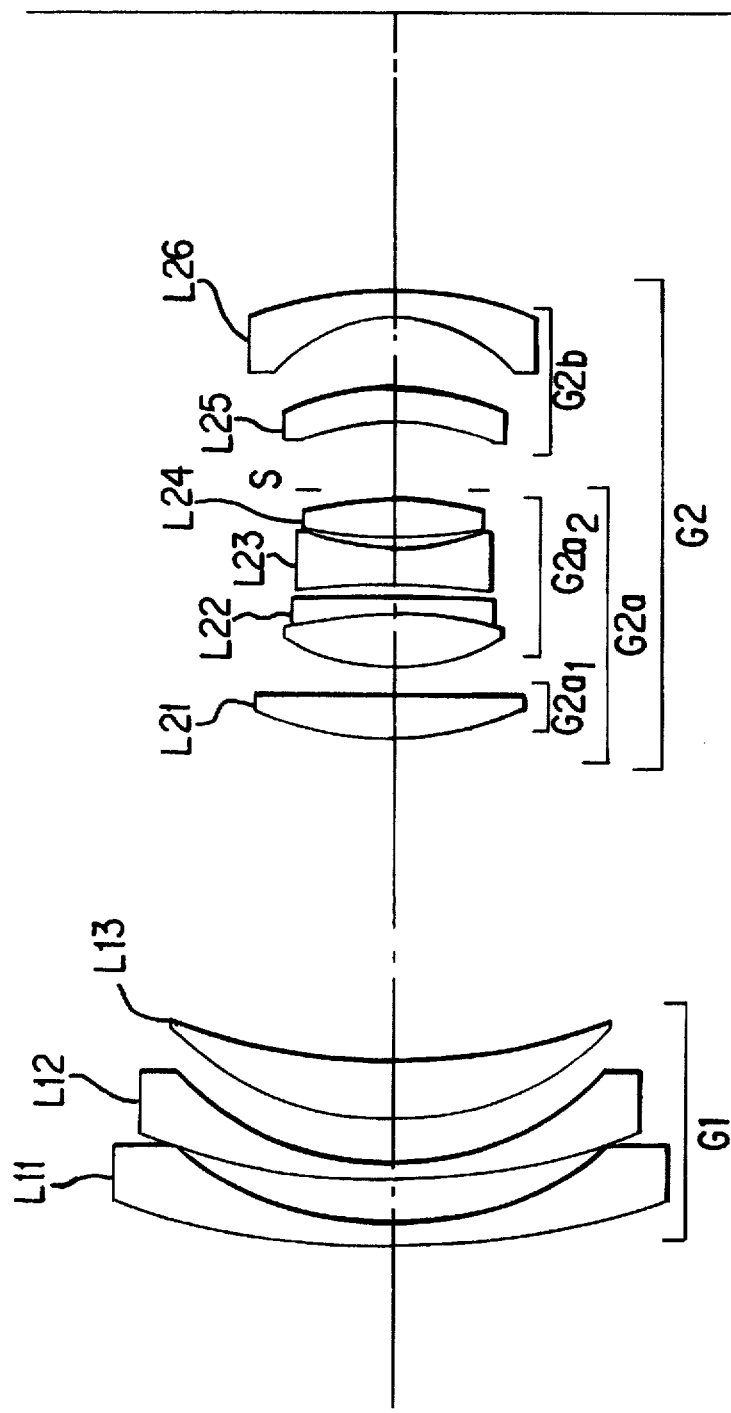
FIG. 24 shows the structure of a zoom lens according to a fourth embodiment of the present invention.
Figure 25:
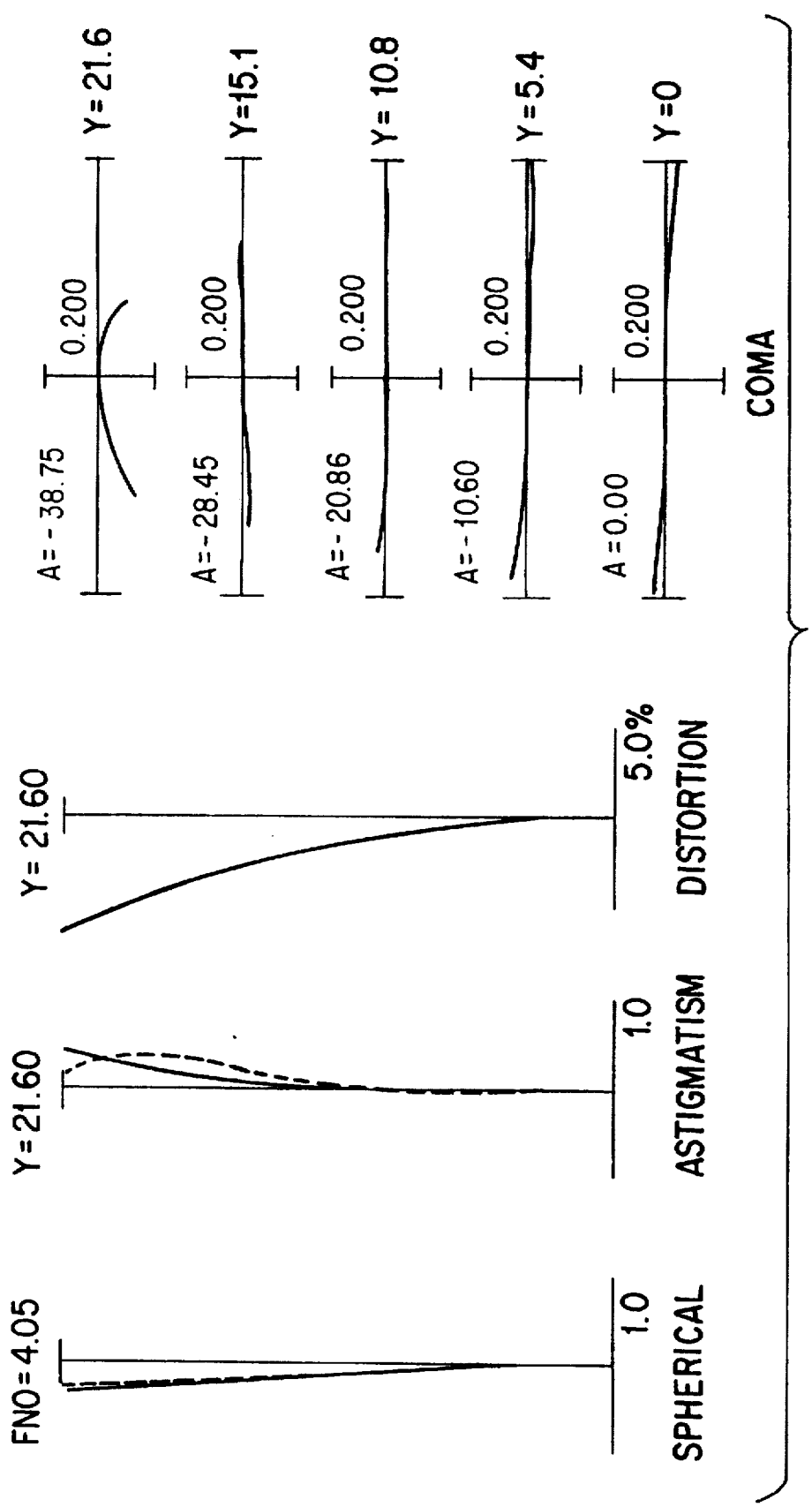
FIG. 25 shows the various aberrations for the infinite focus state at maximum wide-angle state in the fourth embodiment.
Figure 26:
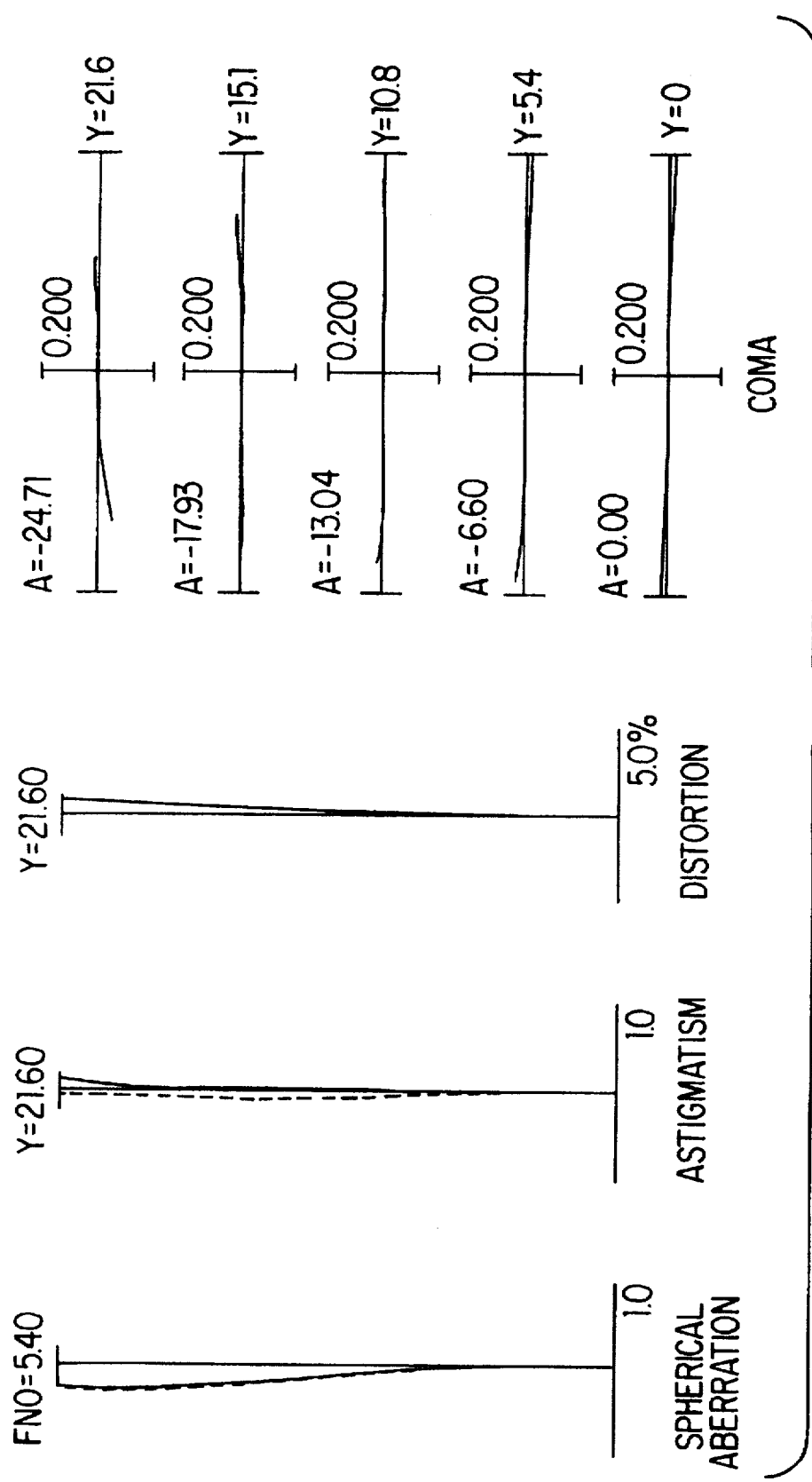
FIG. 26 shows the various aberrations for the infinite focus state at intermediate focal length state in the fourth embodiment.
Figure 27:
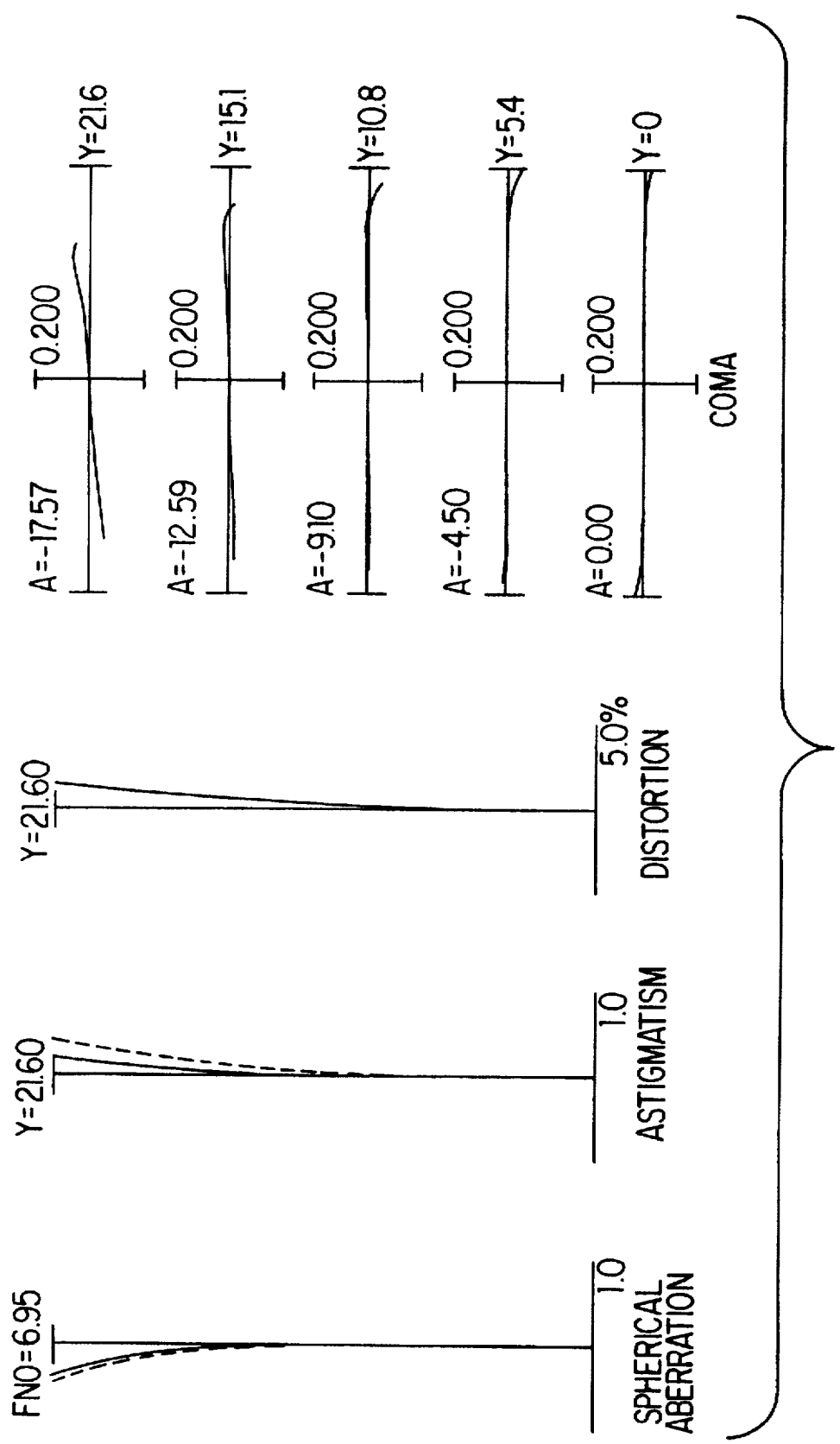
FIG. 27 shows the various aberrations for the infinite focus state at maximum telephoto state in the fourth embodiment.
Figure 28:
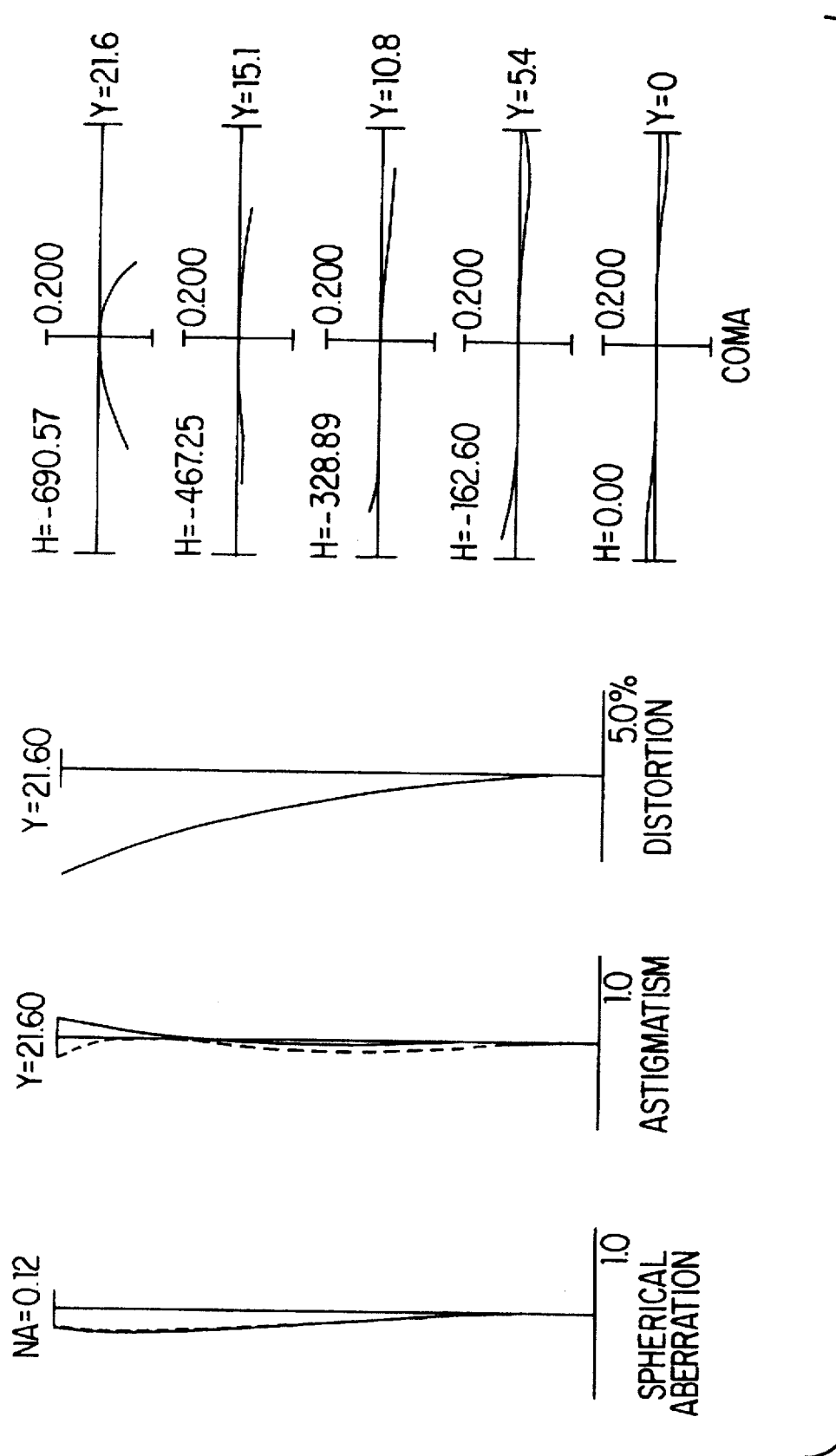
FIG. 28 shows the various aberrations for the close-distance focus state at maximum wide-angle state in the fourth embodiment.
Figure 29:
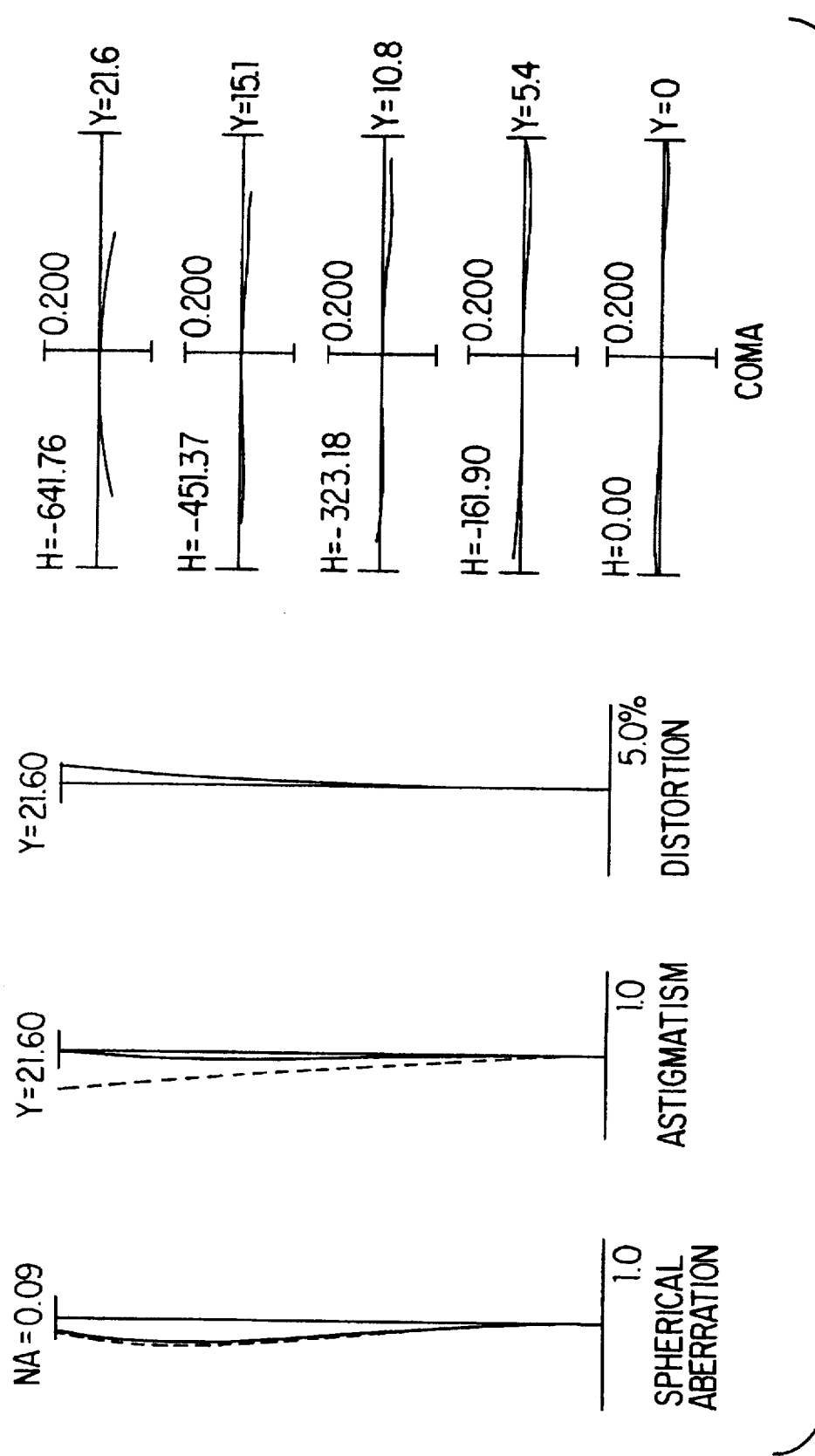
FIG. 29 shows the various aberrations for the close-distance focus state at intermediate focal length in the fourth embodiment.
Figure 30:
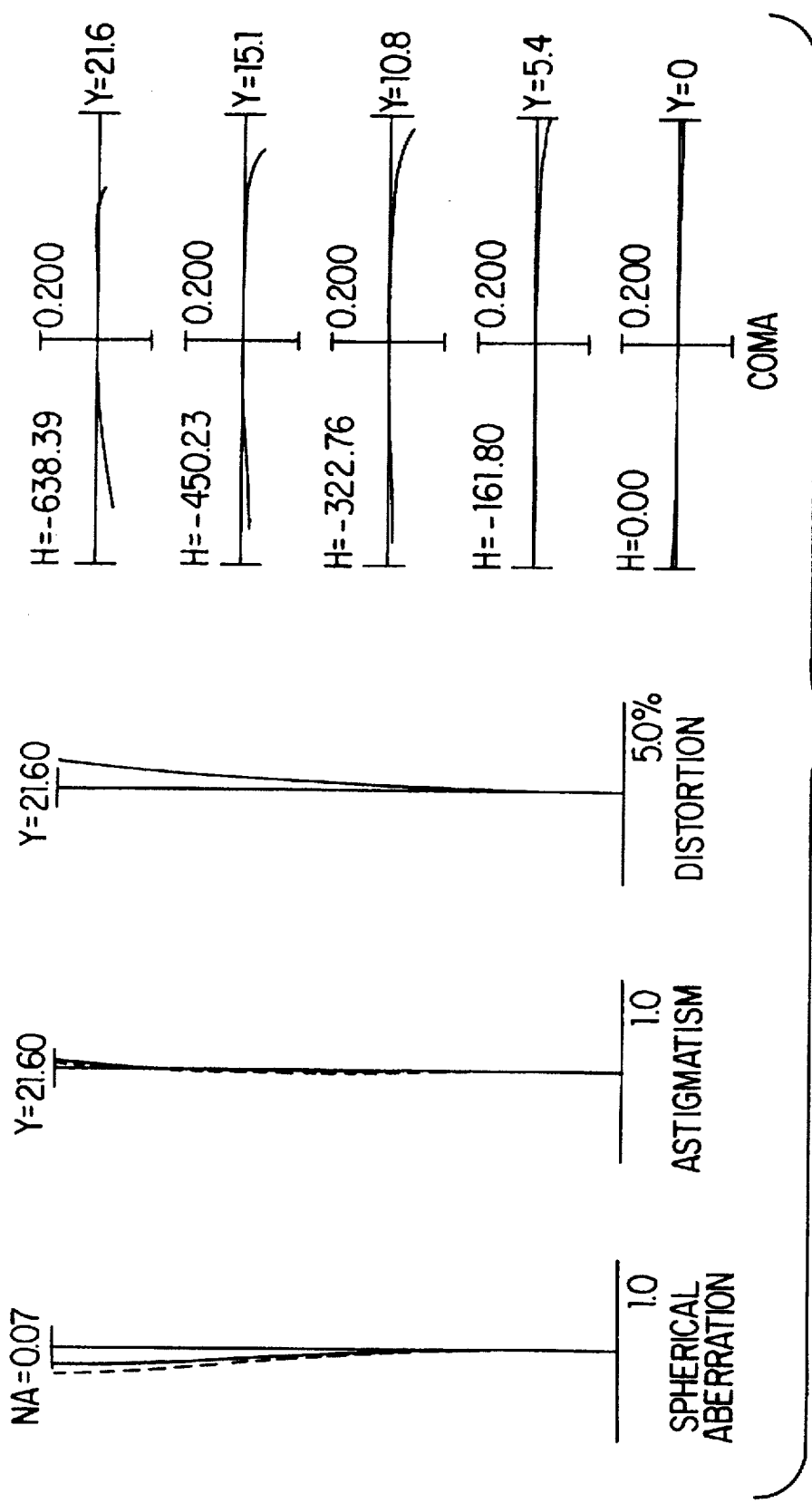
FIG. 30 shows the various aberrations for the close-distance focus state at maximum telephoto state in the fourth embodiment.

FIG. 24 shows the structure of a zoom lens in a fourth embodiment of the present invention.

The zoom lens shown in the figure comprises, in order from the object side, a first lens group G1 including negative meniscus lens L11 with the convex surface facing the object side, a negative meniscus lens L12 with the convex surface facing the object side, and a positive meniscus lens L13 with the convex surface facing the object side. Adjacent first lens group G1 is second lens group G2. The second lens group G2 comprises a first lens subgroup G2a on the object side and a second lens subgroup G2b on the image side. The first lens subgroup G2a includes a first lens unit G2a$_1$ on the object side and a second lens unit G2a$_2$ on the image side. The first lens unit G2a$_1$ includes biconvex lens L21. The second lens unit G2a$_2$ includes a cemented positive lens L22 having a biconvex lens and a negative meniscus lens with the concave surface facing the object side, a biconcave lens L23 and a biconvex lens L24. A second lens subgroup G2b includes a positive meniscus lens L25 with the concave surface facing the object side, and a negative meniscus lens L26 with the concave surface facing the object side.

FIG. 24 shows the positional relationship of each lens group at the maximum wide-angle state. The lens groups move on the optical axis along the zoom locus shown by the arrow in FIG. 1 during zooming to maximum telephoto state.

Moreover, an aperture-stop S is provided between the first lens subgroup G2a and the second lens subgroup G2b.

The values of various dimensions of the fourth embodiment of the present invention are listed in Table (4) below. In Table (4), f denotes focal length, FNO denotes F-number, 2ω denotes field angle, and Bf denotes back focus. Moreover, the refractive indices and Abbe numbers are the values corresponding to a d-line (λ=587.6 nm). The aperture ratio at the infinite focus state is defined by F-number (FNO) and numerical aperture (NA). In addition, the surface numbers indicate the order of the lens surfaces along the direction in which the light rays move.

TABLE 4 f = 28.80–46.82–67.20 mm
FNO = 3.83–5.30–6.97
2ω = 74.97–48.52–34.92°

| Surface Number | Radius of Curvature | Intersurface Distance | Abbe Number | Refractive Index |
|---|---|---|---|---|
| 1 | 53.7484 | 1.408 | 45.37 | 1.79668 |
| 2 | 21.3921 | 2.816 | | |
| 3 | 42.9528 | 1.280 | 43.35 | 1.84042 |
| 4 | 19.0318 | 2.944 | | |
| 5 | 20.3672 | 3.840 | 27.61 | 1.75520 |
| 6 | 41.8325 | (d6 = variable) | | |
| 7 | 20.2612 | 2.816 | 60.14 | 1.62041 |
| 8 | 232.5769 | 1.920 | | |
| 9 | 14.6217 | 3.456 | 59.60 | 1.53996 |
| 10 | −26.3263 | 1.024 | 23.01 | 1.86074 |
| 11 | −132.1234 | 0.640 | | |
| 12 | −49.4641 | 2.560 | 43.35 | 1.84042 |
| 13 | 15.3902 | 0.640 | | |
| 14 | 22.5125 | 2.560 | 41.96 | 1.66755 |
| 15 | −23.0999 | 0.640 | | |
| 16 | ∞ | 4.480 | (aperture stop) | |
| 17 | −16.3562 | 2.304 | 40.90 | 1.79631 |
| 18 | −14.0394 | 4.480 | | |
| 19 | −9.9751 | 1.536 | 55.60 | 1.69680 |
| 20 | −25.4471 | (Bf) | | |

(variable space for zooming)

| f | 28.8086 | 46.8191 | 67.2030 |
|---|---|---|---|
| d6 | 20.9642 | 8.1413 | 1.9200 |
| Bf | 19.2821 | 30.3719 | 42.9230 |

(values corresponding to conditions)

f1 = −39.4917
f2 = 23.9594
f2a = 21.7785
f2b = −33.4650
(1) Bfw/fw = 0.669
(2) $|f1|/(fw \times ft)^{1/2} = 0.898$
(3) f2a/|f2b| = 0.651
(4) f2b/f1 = 0.847
(5) $f2/(fw \times ft)^{1/2} = 0.545$
(focussing displacement of lens group G2a2 at photographic magnification of −1/30)

| f | 28.8086–46.8191–67.2030 |
|---|---|
| displacement | 0.4261–0.4503–0.4292 |

(Here, the direction of movement from the image side to the object side is taken as positive)
(values corresponding to conditions)

f2a$_2$ = 50.5106
f2b = −29.4847
(6) β2a$_2$t = 0.276
(7) $f2a_2/(fw \times ft)^{1/2} = 1.064$
(8) |f2b|/fw = 1.162

FIGS. 25 through 30 show various aberration diagrams for the fourth embodiment, and are respectively: various aberration diagrams for the infinite focus state at maximum wide-angle state, various aberration diagrams for the infinite focus state at intermediate focal length state, various aberration diagrams for the infinite focus state at maximum telephoto state, various aberration diagrams at a close-distance focus state (a photographic magnification of −1/30) at the maximum wide-angle state, various aberration diagrams at a close-distance focussing state (photographic magnification of −1/30) at a medium focal length state, and various aberration diagrams at a close-distance focussing state (photographic magnification of −1/30) at the maximum telephoto state.

In each aberration diagram, FNO denotes F-number, NA denotes numerical aperture, Y denotes image height, A denotes field angle with respect to each image height, and H denotes the object height with respect to each image height, respectively.

Moreover, in the aberration diagram describing astigmatism, the solid line represents the sagittal image plane while the broken line represents the meridional image plane. Furthermore, in the aberration diagram describing spherical surface aberration, the broken line represents the sine condition.

Each aberration diagram clearly shows that various aberrations are favorably corrected at each focal length condition from infinite focus state to close distance focus state in the present invention.

As described above, the present invention provides a wide-angle zoom lens composed of a few pieces of lenses capable of a high zooming ratio with superior performance.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A wide-angle zoom lens system having a plurality of lens groups positioned along an optical axis from an object side to an image side, the zoom lens system comprising:

a first lens group of negative refractive power nearest the object side of the zoom lens system; and a second lens group of positive refractive power adjacent the first lens group on the image side, the second lens group comprising, a first lens subgroup of positive refractive power nearest the object side of the second lens group, and a second lens subgroup of negative refractive power on the image side of the first lens subgroup, wherein each lens group moves during zooming from the maximum wide-angle state to a maximum telephoto state so that a distance between the first lens group and the second lens group decreases and the zoom lens system satisfies the conditions:

$$0.2 < Bfw/fw < 0.75,$$

$$0.6 < |f1|/(fw \times ft)^{1/2} < 0.95,$$

and $$0.4 < f2a/|f2b| < 0.85,$$

where:

Bfw is a back focus at a maximum wide-angle state;

fw is a focal length of the entire zoom lens system at a maximum wide-angle state;

f1 is a focal length of the first lens group;

ft is a focal length of the entire zoom lens system at a maximum telephoto state;

f2a is a focal length of the first lens subgroup; and f2b is a focal length of the second lens subgroup.

2. The wide-angle zoom lens system of claim 1, wherein the focal length fw, the focal length ft, the focal length f1, the focal length f2 of the second lens group, and the focal length f2b satisfy:

$$0.4 < f2b/f1 < 1.0;$$

and $$0.3 < f2/(fw \times ft)^{1/2} < 0.8.$$

3. The wide-angle zoom lens system of claim 1, wherein the first lens subgroup within the second lens group comprises:

a first lens unit of positive refractive power nearest the object side in the first lens subgroup and a second lens unit of positive refractive power on the image side of the first lens unit.

4. The wide-angle zoom lens system of claim 3, wherein an aperture stop is provided within the second lens group in a location selected from the object side of the second lens unit and the image side of the second lens unit.

5. A wide angle zoom lens system having a plurality of optical elements positioned along an optical axis from an object side to an image side, the system comprising:

a first lens group of negative refractive power nearest the object side; and a second lens group of positive refractive power adjacent the first lens group on the image side;

the second lens group comprising, a first lens subgroup of positive refractive power and a second lens subgroup of negative refractive power arranged on the image side of the first lens subgroup, the first lens subgroup comprising, a first lens unit of positive refractive power, and a second lens unit of positive refractive power arranged on the image side of the first lens unit, wherein only the second lens unit moves along the optical axis with respect to the first lens unit for focusing on close-distance objects.

6. The wide-angle zoom lens system of claim 5, wherein the second lens unit has an imaging magnification $\beta 2a_2 t$ at the maximum telephoto state, such that $-0.5 < \beta 2a_2 t < 0.6$ is satisfied.

7. The wide-angle zoom lens system of claim 5, wherein the condition:

$$0.8 < f2a_2/(fw \times ft)^{1/2} < 1.4$$

is satisfied, where $f2a_2$ is a focal length of the second lens unit, fw is a focal length of a totality of the lens system at a maximum wide-angle state, and ft is a focal length of the totality of the lens system at a maximum telephoto state.

8. The wide-angle zoom lens system of claim 5, wherein the second lens subgroup has at least one positive lens element and one negative lens element; and, the condition:

$$0.7 < |f2b|/fw < 1.4$$

is satisfied, where f2b is a focal length of the second lens subgroup and fw is a focal length of a totality of the lens system at a maximum wide-angle state.

9. The wide-angle zoom lens system of claim 5, wherein an aperture stop is provided at one of the object side of and the image side of the second lens unit.

10. A method for focussing on close-distance objects with a wide-angle zoom lens comprising a first lens group of negative refractive power nearest an object side of the zoom lens and a second lens group of positive refractive power on an image side of the first lens group, the second lens group comprising a first lens subgroup of positive refractive power nearest the object side and a second lens subgroup of negative refractive power on the image side of the first lens subgroup, wherein the first lens subgroup comprises a first lens unit nearest the object side and a second lens unit adjacent the first lens unit, the method comprising:

moving only the second lens unit along an optical axis of the zoom lens relative to the first lens unit such that a magnification $\beta 2a_2t$ of the second lens unit at a maximum telephoto state satisfies the condition $-0.5 < \beta 2a_2t < 0.6$.

11. The method of claim 10, further comprising the steps of selecting and positioning lens components such that $0.8 < f2a_2/(fw \times ft)^{1/2} < 1.4$ is satisfied, where $f2a_2$ is a focal length of the second lens unit, fw is a focal length of a totality of the lens system at a maximum wide-angle state, and ft is a focal length of the totality of the lens system at the maximum telephoto state.

12. The method of claim 10, further comprising providing the second lens subgroup with at least one positive lens element and one negative lens element such that the condition:

$0.7 < |f2b|/fw < 1.4$ is satisfied, where f2b is a focal length of the second lens subgroup and fw is the focal length of the totality of the lens system at a maximum wide-angle state.

13. The method of claim 10, further comprising providing an aperture stop at one of a location on the object side of the second lens unit and a location on the image side of the second lens unit.

14. A wide-angle zoom lens comprising, from an object side to an image side:

a first lens group having a negative refractive power; and a second lens group having a positive refractive power, the second lens group comprising:

a first lens subgroup comprising five lens elements, a second lens subgroup comprising two lens elements, and an aperture stop positioned between the first lens subgroup and the second lens subgroup, wherein the second lens group moves so that a distance between the first lens group and the second lens group decreases during zooming.

15. The wide-angle zoom lens of claim 14, wherein the first lens subgroup comprises three positive lens elements and a negative lens element.

16. The wide-angle zoom lens of claim 15, wherein:

the first lens subgroup comprises, in order from the object side, a first positive lens element, a positive cemented lens element, a first negative lens element, and a second positive lens element; and the second lens group comprises, in order from the object side, a third positive lens element, and a second negative lens element.

* * * * *

UNITED STATES PATENT AND TRADEMARK OFFICE
CERTIFICATE OF CORRECTION

PATENT NO. : 5,737,129
DATED : April 7, 1998
INVENTOR(S) : Ohtake, et. al.

It is certified that error appears in the above-identified patent and that said Letters Patent is hereby corrected as shown below:

Column 20, line 54, change "where $f2a_2$ is" to read -- where $f2a_2''$ is --.

Column 21, line 22, change "where $f2a_2$ is" to read -- where $f2a_2''$ is --.

Signed and Sealed this

Ninth Day of March, 1999

Attest:

Q. TODD DICKINSON

*Attesting Officer*   *Acting Commissioner of Patents and Trademarks*